US012673894B2

(12) United States Patent
Shi et al.

(10) Patent No.: US 12,673,894 B2
(45) Date of Patent: Jul. 7, 2026

(54) GRAPHENE OXIDE FINE AGGREGATE IN CEMENT COMPOSITES

(71) Applicant: WASHINGTON STATE UNIVERSITY, Pullman, WA (US)

(72) Inventors: Xianming Shi, Pullman, WA (US); Jing Zhong, Pullman, WA (US)

(73) Assignee: Washington State University, Pullman, WA (US)

( * ) Notice: Subject to any disclaimer, the term of this patent is extended or adjusted under 35 U.S.C. 154(b) by 208 days.

(21) Appl. No.: 18/555,340

(22) PCT Filed: Apr. 18, 2022

(86) PCT No.: PCT/US2022/025179
§ 371 (c)(1),
(2) Date: Oct. 13, 2023

(87) PCT Pub. No.: WO2022/221754
PCT Pub. Date: Oct. 20, 2022

(65) Prior Publication Data
US 2024/0199486 A1 Jun. 20, 2024

Related U.S. Application Data

(60) Provisional application No. 63/175,820, filed on Apr. 16, 2021.

(51) Int. Cl.
*C04B 14/06* (2006.01)
*C04B 18/02* (2006.01)
(Continued)

(52) U.S. Cl.
CPC .............. *C04B 18/02* (2013.01); *C04B 14/06* (2013.01); *C04B 20/023* (2013.01); *C04B 28/04* (2013.01);
(Continued)

(58) Field of Classification Search
CPC .. H01B 1/18; H01B 1/24; C04B 14/06; C04B 14/386; C04B 18/02; C04B 18/021;
(Continued)

(56) References Cited

U.S. PATENT DOCUMENTS 3,447,937 A 6/1969 Hersey et al.
10,647,612 B2 * 5/2020 Shi ........................ C04B 22/147
(Continued)

FOREIGN PATENT DOCUMENTS

CN 108191340 A * 6/2018
CN 108793880 A * 11/2018
(Continued)

OTHER PUBLICATIONS

From PCT/ISA/237 (mailed Jul. 6, 2022).*
(Continued)

*Primary Examiner* — Mark Kopec
(74) *Attorney, Agent, or Firm* — WCF IP

(57) ABSTRACT

A cementitious nano-engineered method and resultant composite includes a modified aggregate material configured from a plurality of fine aggregate particles (FAg) particles pretreated with a graphene oxide (GO), wherein the graphene oxide (GO) is further arranged as a plurality of crosslinked structures that arranges for a refined interfacial zone (ITZ) with a thickness of 3 μm to 10 μm; and a water/cement (w/c) ratio content configured with the modified aggregate material. The interface of modified aggregate and a cementitious phase largely determines the mechanical properties and durability performances of cement mortar and concrete. Moreover, the methods and composites also provide for a targeted and more efficient approach to develop smart cement composites through nanoengineering of the interfacial transition zone.

18 Claims, 24 Drawing Sheets

Cement Matrix

| | | | |
|---|---|---|---|
| ↑ | Microcrack | (◎) | Cement |
| ⬡ | GO | ◇ | CH |
| ⬦ | C-S-H gel | / | AFt |

(51) Int. Cl.

| | |
|---|---|
| *C04B 20/02* | (2006.01) |
| *C04B 28/04* | (2006.01) |
| *C04B 40/00* | (2006.01) |
| *C04B 40/02* | (2006.01) |
| *H01B 1/18* | (2006.01) |
| *C04B 111/94* | (2006.01) |

(52) U.S. Cl.
CPC ...... *C04B 40/0032* (2013.01); *C04B 40/0046* (2013.01); *C04B 40/0281* (2013.01); *H01B 1/18* (2013.01); *C04B 2111/94* (2013.01)

(58) Field of Classification Search
CPC . C04B 28/04; C04B 40/0032; C04B 40/0046; C04B 2201/50
See application file for complete search history.

(56) References Cited

U.S. PATENT DOCUMENTS

| | | |
|---|---|---|
| 2018/0327611 A1 | 11/2018 | Scheffer et al. |
| 2020/0339473 A1 | 10/2020 | Craciun et al. |

FOREIGN PATENT DOCUMENTS

| | | | |
|---|---|---|---|
| CN | 112142410 A | * | 12/2020 |
| WO | 2013/096990 A1 | | 7/2013 |
| WO | 2020/078578 A1 | | 4/2020 |

OTHER PUBLICATIONS

Long et al "Performance enhancement and environmental impact of cement composites containing graphene oxide with recycled fine aggregates", Journal of Cleaner Production 194 (2018) 193-0202.*

Lu et al "Aggregation size effect of graphene oxide on its reinforcing efficiency to cement-based materials", Cement and Concrete Composites 100 (2019) 85-91.*

Yan et al "Study of optimizing graphene oxide dispersion and properties of the resulting cement mortars", Construction and Building Materials 257 (2020) 119477.*

Yu "Using graphene oxide to improve the properties of ultra-high-performance concrete with fine recycled aggregate", Construction and Building Materials 259 (2020) 120657.*

Roy et al "Effect of Graphene Oxide Nanosheets dispersion in cement mortar composites incorporating Metakaolin and Silica Fume", Construction and Building Materials 186 (2018) 514-524.*

* cited by examiner

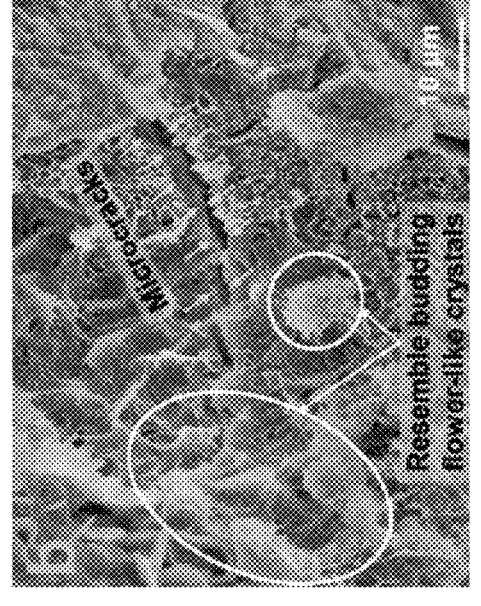
FIG. 7B
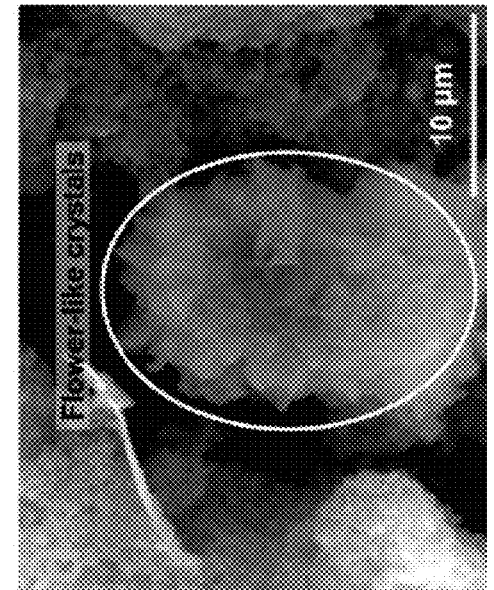
FIG. 7D
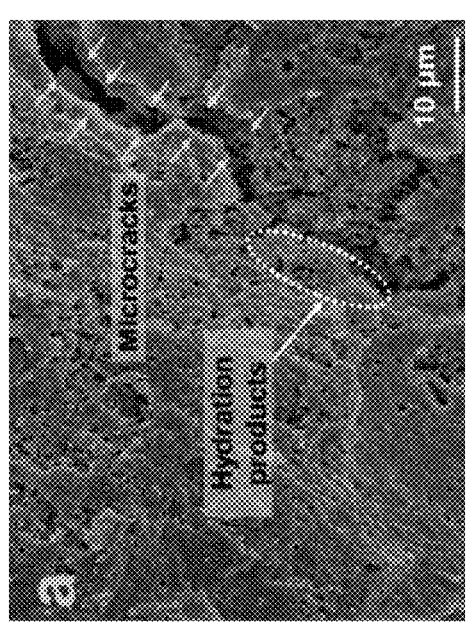
FIG. 7A
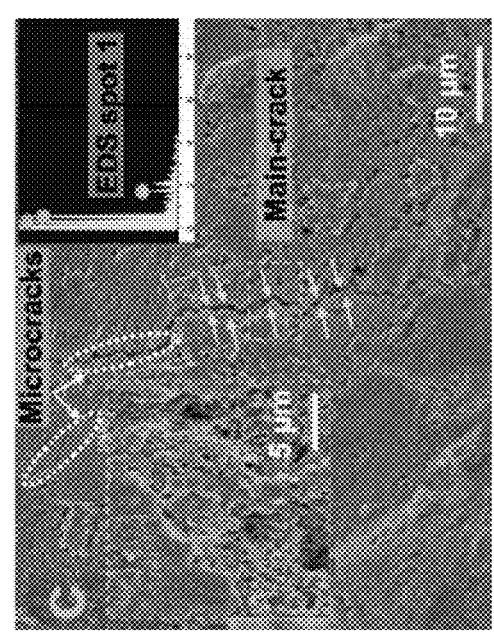
FIG. 7C

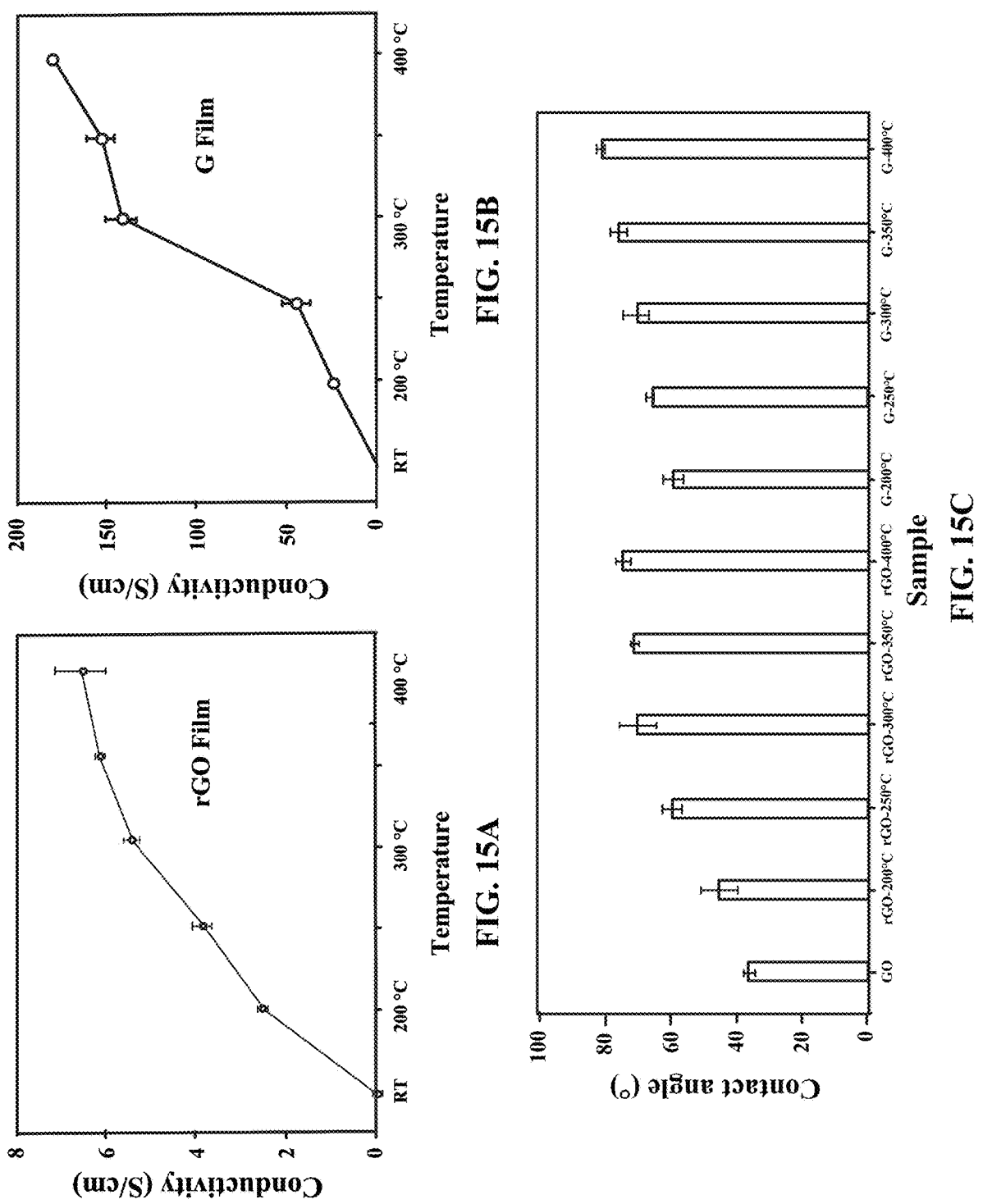

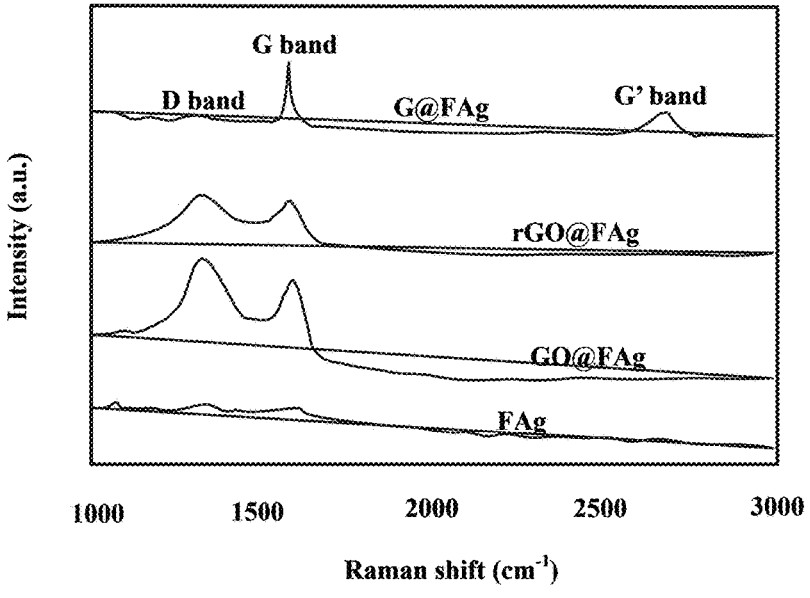
FIG. 16A
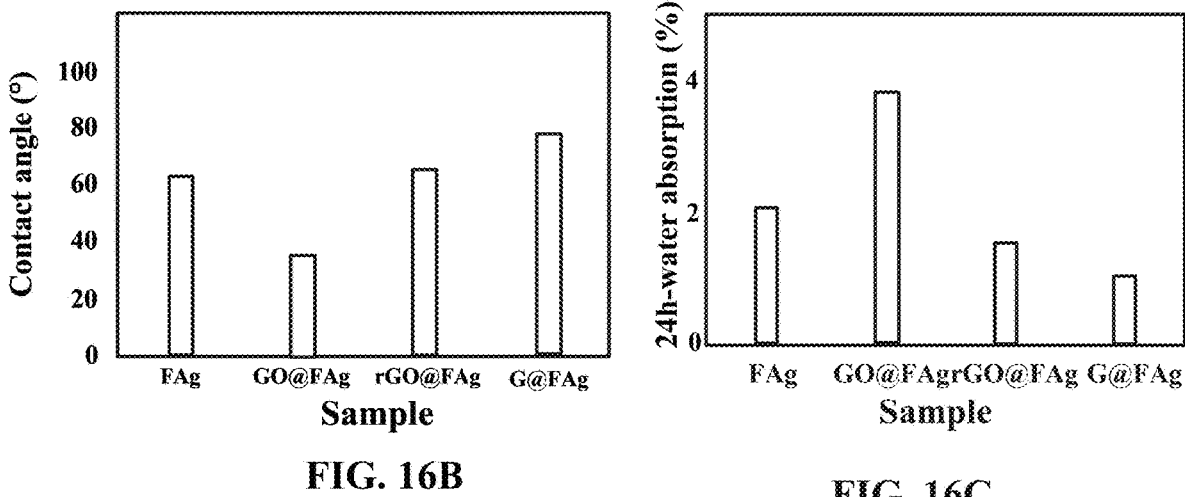
FIG. 16B                           FIG. 16C

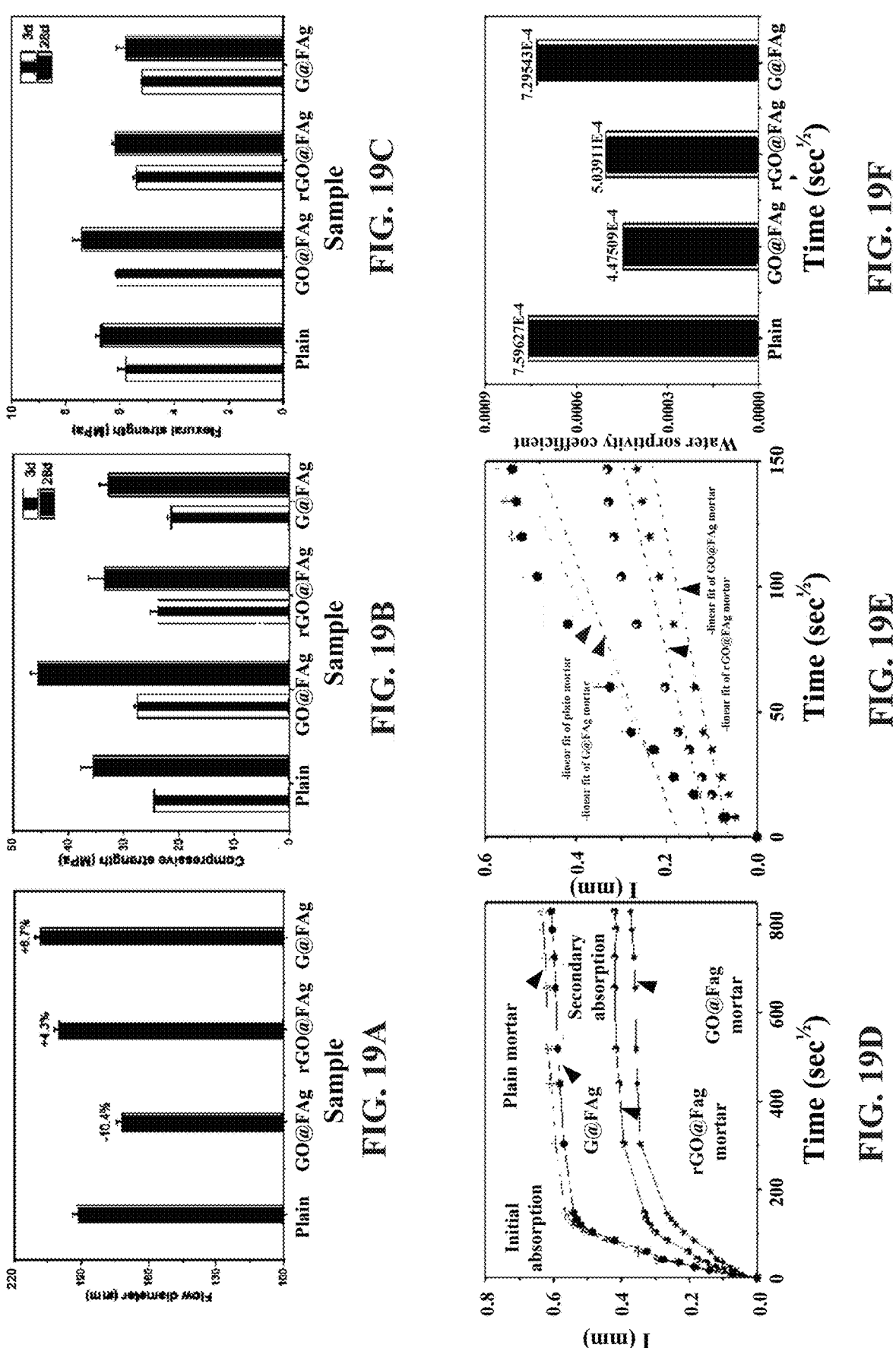

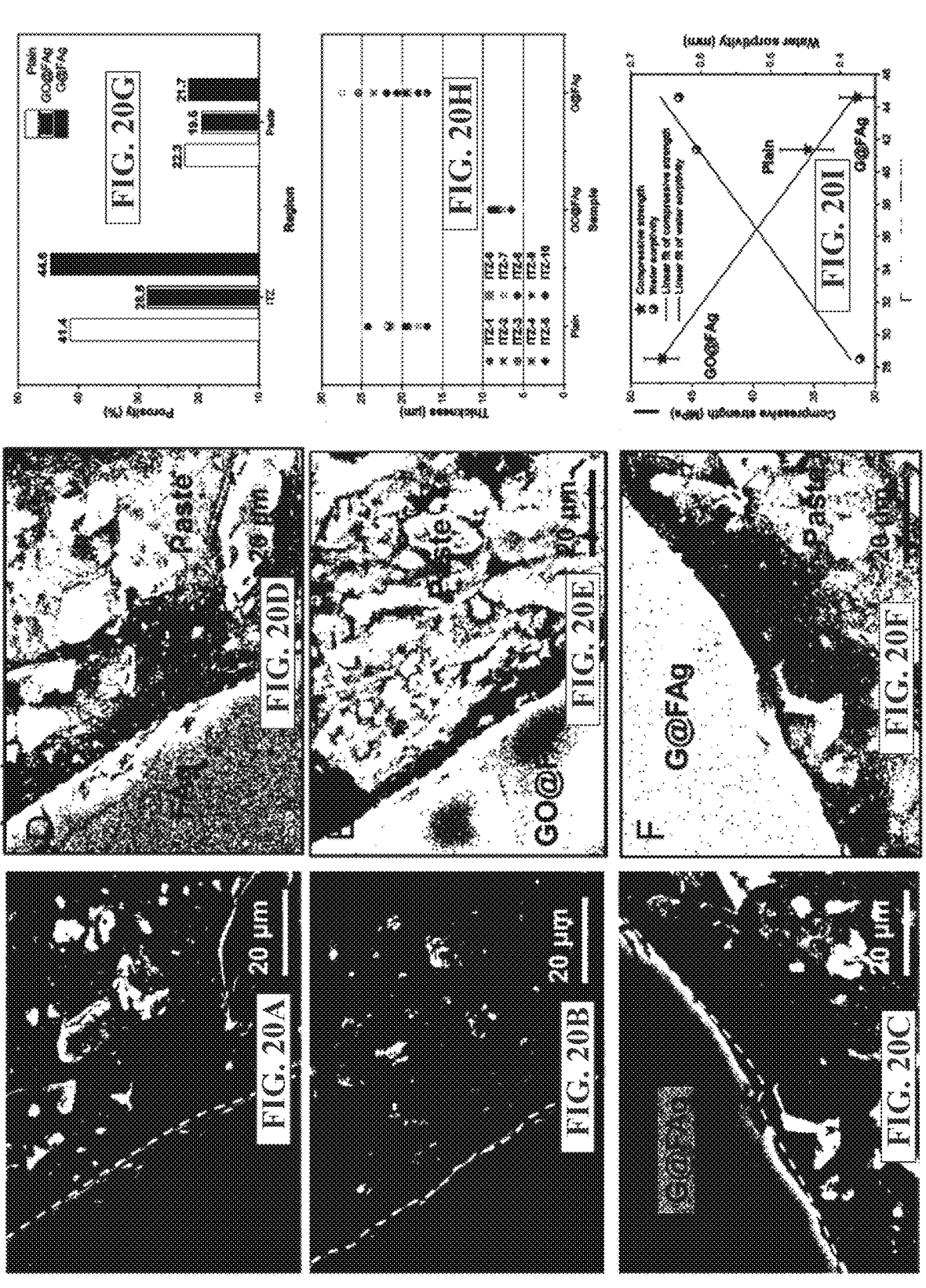

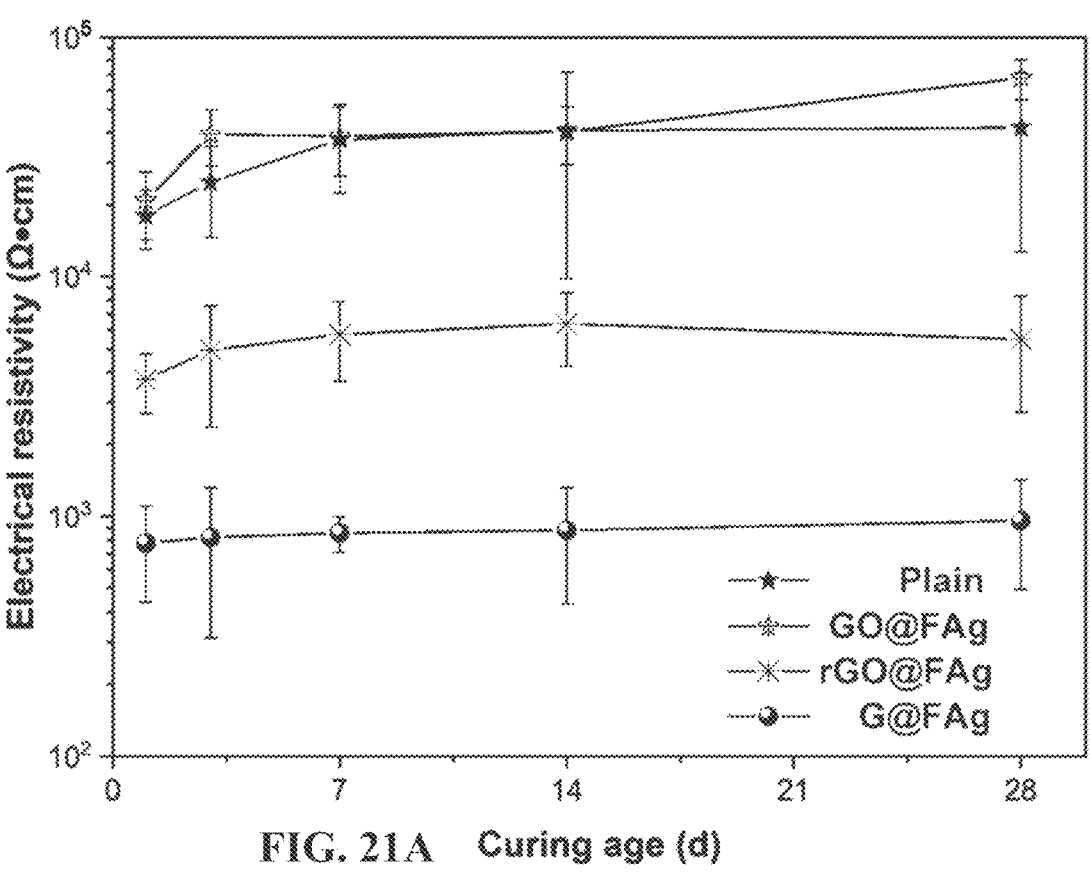
FIG. 21A    Curing age (d)
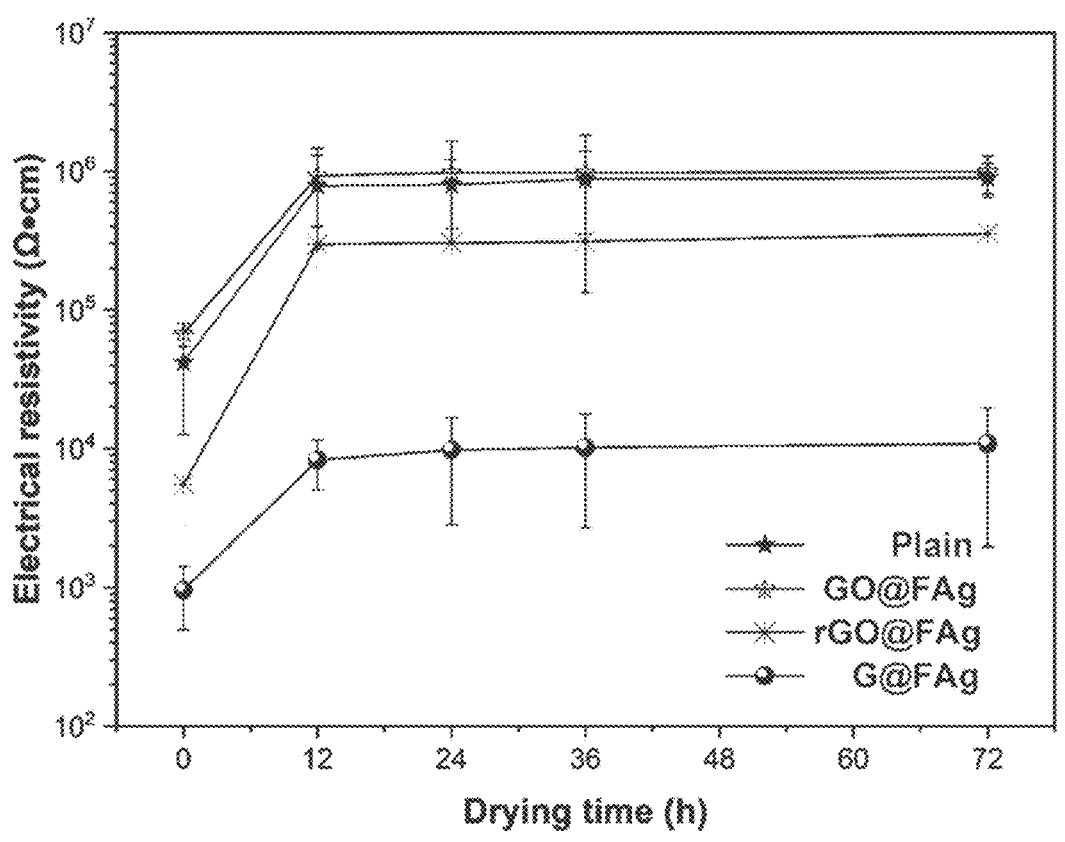
FIG. 21B

GRAPHENE OXIDE FINE AGGREGATE IN CEMENT COMPOSITES

CROSS-REFERENCE TO RELATED APPLICATION

The present application claims under 35 U.S.C. § 119, the priority benefit of U.S. Provisional Application No. 63/175, 820, filed Apr. 16, 2021, entitled "Graphene oxide nano-engineers the interfacial transition zone on fine aggregate in cement composites," which is incorporated herein by reference in its entirety.

FIELD OF INVENTION

The embodiments herein relate to methods and compositions of fine aggregates coated with graphene. More particularly, the embodiments herein relate to compositions and methods of pre-saturating fine aggregates of a cementitious composite in graphene oxide to enhance interfacial transition zones.

BACKGROUND OF THE INVENTION

Modern civil engineering extensively uses cement composites as affordable and versatile artificial building materials. However, the quasi-brittle behavior of the cement composites is associated with crack propagation and poor tensile strength limiting the structural applications of the cement composites. The toughness and strength enhancement can be realized by constraining the crack propagation or densification of cement composites.

In recent years, a variety of carbon-based nanomaterials, including carbon nanotubes, carbon nanofibers, and graphene oxide (GO), have been employed to reinforce cementitious composites. Among these nanomaterials, GO has demonstrated great potential to enhance the strengths and toughness of cement-based materials, due to its sheet-like structure with an aspect ratio up to ~30,000, abundance of surface oxygen-containing functional groups, and excellent mechanical strength.

Reinforcement mechanisms by GO mainly include acceleration of cement hydration, acting as a nanofiller, and bridging effect. For instance, the introduction of 0.1 wt % GO increases the tensile strength of a cement mortar by approximately 37%, which is attributed to the stronger bond strength between Calcium-Silicate-Hydrate (C-S-H), which is primarily responsible for strength, and GO nanosheets. The addition of 0.1 wt % is shown to refine the pore structure and increase the flexural strength of a cement mortar by approximately 23%.

To utilize and employ the outstanding properties of GO, a series of special treatments of GO to avoid its possible agglomeration in alkaline pore solution are indispensable. However, these special treatments are known to be time-consuming, costly, and difficult to apply on a large scale. The current approaches to disperse GO in the cement matrix even with the assistance of an admixture, for example, polycarboxylate superplasticizer, is not effective. This ineffectiveness is ascribed to the strong electrostatic interactions between the negatively charged GO layers and cation ions, such as, for example, $Ca^{2+}$, $K^+$, and $Na^+$, in the cement pore solution. The reasons stated herein indicate that the aggregation of GO in the cement matrix act as a defect which tends to undermine the reinforcement effect of GO and possibly adversely affect the performances of cement composites.

As known in the art, concrete is a multiphase composite material at the microstructural level that includes three main phases: aggregate particles, bulk cement paste (matrix) and an interfacial transition zone (ITZ) between the aggregates and the matrix. Such an interfacial transition zone ITZ) between aggregates and the cement matrix is generally known to be the weakest zone than the cement matrix itself, due to its relatively less compaction and higher porosity. ITZ typically refers to a thin-shell region of about 5 to 100 μm thick surrounding coarse aggregate particles. Even in high-performance concrete with a water to binder ratio of less than 0.4, the ITZ is generally the weakest area. In an engineering mechanics model, hydrate failure in the ITZ is revealed to govern the concrete strength. A weak interface region of typically 4 to 30 μm thick that exists between fine aggregate (FAg) and the cement matrix in cement mortar also significantly influences its engineering performance. FAg is an integral part of cement composites as it is known to occupy about 60-75% of the total volume in a typical cement mortar and about 35% of the total volume in a typical cement concrete.

Background information on nano-reinforcing aggregates in concrete mixture, is described and claimed in China Patent No. CN102092993A entitled, "Nano reinforcing method for recycled aggregate concrete," filed Jun. 15, 2011, to Qian et al, including the following, " . . . after the surface of the recycled aggregate is in a moist state, further mixing the recycled aggregate with all admixtures for 5-10 s; and mixing and stirring with cement, water and a high-efficiency water reducing agent for 20-45 s to obtain a nano-reinforced recycled aggregate concrete mixture. The nano reinforcing method has a principle that by changing a stirring process and introducing the nano dispersion, nano particles can be adsorbed into the opening pores and microcracks of the recycled aggregate, an admixture enriched layer is further formed on the surface of the recycled aggregate, the nano particles permeating into the interiors of the opening pores of the recycled aggregate and the admixture enriched layer formed on the surface of the recycled aggregate . . . ."

Background information on using nano-material in composite concrete, is described and claimed in China Patent No. CN102199021B entitled, "Nano-material composite concrete with super high performance." filed Nov. 7, 2012, to Wang Baomin, including the following. " . . . high performance water reducer, 0.05 to 0.25 kg of multi-walled carbon nanotubes and 15 to 25 kg of nanometer silica. The preparation technology is to carry out mechanical stirring for 180 to 240 seconds. The carbon nanotubes are added in the form of dispersion liquid, and a dispersant is cetyl trimethyl ammonium bromide (C16TAB), wherein the dispersion liquid is prepared according to the following portion MWNRs: C16TAB:water=0.48 g:4.1 g:40 ml. The invention enables the super high performance concrete to have an enhanced mechanical property and lasting quality, a drastically increased service life . . . ."

Background information on nano-engineered cementitious composites, is described in "Nano-engineered Cementitious Composites and Electrical Impedance and Electrical Impedance Tomography for Spatial Damage Detection," published in the Journal Materials Science (2016) including the following, " . . . nano-engineered, multifunctional, cementitious composites by modifying cement-aggregate interfaces with spray-coated carbon nanotube (CNT)-latex thin films during casting. Film-coated aggregates maintained CNT dispersion, enhanced conductivity, and used >100× less nanomaterials (and costs) than leading works. In addition, an electrical impedance tomography (EIT) algorithm was implemented for reconstructing the material's spatial resistivity distribution . . . ."

Recent years have also seen an increase in the development of smart cementitious composites. In particular, electrically conductive cement composites have shown great potential for a wide variety of practical applications, such as structural health monitoring, de-icing or snow melting, and electromagnetic interference shielding. Over the past, there has been extensive exploration of electrically conductive cement composites through direct addition of conductive substances or phases such as carbon black, carbon fibers, carbon nanotubes, graphene into the host matrix.

The direct incorporation of these conductive fillers into the cement matrix can decreases its electrical resistivity and mechanical strength by several orders of magnitude. In addition to strength reduction, the typically time-consuming and energy-intensive process employed to disperse these conductive phases in the cement matrix further limit the implementation of electrically conductive cement composites. Furthermore, a high concentration of CNTs (>0.5%, by weight of cement) or graphene (>2%, by weight of cement) to be admixed into the cement matrix. Directly admixing such high concentrations of nanomaterials results in increased viscosity and reduced workability of the fresh mixture during mixing and casting, potentially posing a negative impact on the mechanical and durability properties of the hardened cement composites.

Background information on adding conductive fillers to cement composition, is described and claimed in U.S. patent Ser. No. 10/167,714B2 entitled, "Piezoresistive cement nanocomposites," filed Nov. 21, 2014, to Musso et al, including the following, "Methods may include pumping a cement composition containing one or more conductive fillers into an annular region of a wellbore created between a casing and a surface of the wellbore, allowing the cement composition to cure, emplacing a tool for measuring at least one electromagnetic property into the wellbore, and measuring at least one of the cemented casing and the formation. In another aspect, methods may include preparing a cement composition containing one or more conductive fillers, allowing the cement composition to set, and measuring at least one electromagnetic property of the set cement . . . ."

Background information on nanomaterial based cement composites, is described and claimed in China Patent No. CN104446176B entitled, "A kind of cement-based composite material and voltage sensitive sensor thereof," filed Aug. 25, 2014, to Qin et al, including the following, "A kind of cement-base composite material and voltage sensitive sensor thereof, relate to a kind of cement-base composite material and voltage sensitive sensor thereof. Graphene oxide/the Carbon Fiber Cement-based Composites of the present invention and sensor thereof are made up of function ingredients, cement, dispersant, water reducer, defoamer, fine aggregate and other mineral admixture, function ingredients is graphene oxide and carbon fiber . . . ."

Accordingly, a need exists for nano-engineering cementitious composites to mitigate the weakness at the interfacial bonding of ITZ and serve as electrically conductive cement composites with limited reductions in their mechanical strengths and workability. The embodiments disclosed herein address such a need by nanoengineering the properties of cement composite through use of GO. GO is a nearly perfect two-dimensional material, extremely soft and rich in surface oxygen-containing functional groups so that it can be easily adsorbed on the surface of FAg particles. In particular, the embodiments herein employ a GO dispersion to pre-saturate FAg, before the mixing of FAg with cement for enhanced compressive and flexural strengths.

BRIEF SUMMARY OF THE INVENTION

In a first aspect, the embodiments herein are directed to a cementitious composite, that includes: a modified aggregate material, wherein the modified aggregate material is configured from a plurality of fine aggregate particles (FAg) particles pre-treated with a graphene oxide (GO), wherein the graphene oxide (GO) is further arranged as a plurality of crosslinked structures that arranges for a refined interfacial zone (ITZ) with a thickness of 3 μm to 10 μm; and a water/cement (w/c) ratio content configured with the modified aggregate material.

In a second aspect, the embodiments herein are directed to a cementitious composite preparation method, that includes: pre-adsorbing a fine aggregate material with a graphene oxide in an aqueous dispersion, wherein an amount of the graphene oxide in the aqueous dispersion is from about 0.01 to 0.06 percent by weight of the total weight of water and graphene oxide (GO), wherein the pre-adsorbed aggregate material results in a modified aggregate material configured with a refined interfacial zone (ITZ) having a thickness of 3 μm to 5 μm; and adding a water/cement (w/c) ratio content so as to result in a cementitious composite.

In a third aspect, the embodiments herein are directed to a conductive composite method, that includes: coating a solution of graphene oxide on a surface of a plurality of fine aggregate particles; drying the coated plurality of fine aggregate particles to provide a plurality of modified fine aggregate material; reducing the modified fine aggregate material; microwaving the reduced modified fine aggregate material, wherein the reduced modified fine aggregate material provides for a conductive composite material, and wherein the conductive composite material is configured with a refined interfacial zone (ITZ) having a thickness of 5 μm to 10 μm.

In a fourth aspect, the embodiments here are directed to a steam cured cementitious composite, that includes: a modified fine aggregate material, wherein the modified fine aggregate material is an aggregate material pre-adsorbed with a graphene oxide in a range from 0.08 to 0.24 percent by weight of the total weight of the cementitious composition; and a water/cement (w/c) ratio content configured with the modified fine aggregate material, wherein the bonded modified aggregate material is steam cured so as to result in the steam cured cementitious composition.

Accordingly, the embodiments herein provide for a low-cost, facile, and targeted approach to improve the interfacial transition zone (ITZ), using fine aggregate pre-saturated in a GO dispersion (GOmodified fine aggregate, GO-MFAg). Moreover, the embodiments herein are directed to functional conductive mortars prepared using graphene-coated fine aggregate (conductive G@FAg) by a simple method that enables uniform adsorption of graphene oxide onto the surface of FAg particles, followed by simple annealing and microwave treatment

BRIEF DESCRIPTION OF THE DRAWINGS

Many of the drawings submitted herein are better understood as provided by the original images, which are not best depicted in patent application publications at the time of filing. Applicant considers the recreated images, as shown by the drawings, or images that are not representative of what was provided, as part of the original submission and reserves the right to present such images of the drawings in later proceedings.

FIG. 3A shows Images for FAg sedimentation test: the two layers of immiscible liquid (left), GO-dichloromethane after FAg sedimentation (middle), GO@cement pore solution-dichloromethane after sedimentation test (right).

FIG. 3B shows an SEM image of the untreated fine aggregate (FAg).

FIG. 3C shows an SEM image of the FAg pre-adsorbed by GO.

FIG. 3D shows an SEM image of the FAg pre-adsorbed by GO@cement pore solution after the sedimentation test.

FIG. 3E shows corresponding Energy Dispersive Spectroscopy (EDS) analysis.

FIG. 3F shows GO solution (left), the residual GO solution filtered after immersing the FAg in the GO (middle), and the MFAg immersed in deionized water (right). The arrows indicate the FAg coated by GO film.

FIG. 7A shows a scanning electron microscopy (SEM) image of a 0GO-FAg cement mortars.

FIG. 7B shows a scanning electron microscopy (SEM) image of a 0.05GO-FAg cement mortar.

FIG. 7C shows a scanning electron microscopy (SEM) image of a 0.05GO-MFAg (inset is the high magnification of microcrack in the yellow box and energy-dispersive spectrometry (EDS) analysis of spot 1.

FIG. 7D shows a scanning electron microscopy (SEM) image of flower-like crystals found in the ITZ area in the 0.05GO-MFAg mortar. Arrows indicate the microcracks in mortars.

FIG. 15A shows electrical conductivity of an example reduced graphene oxide (rGO) film gradually being increased with the annealing temperature.

FIG. 15B shows subsequent microwave treatment of a film which further greatly promoted the conductivity.

FIG. 15C shows water contact angle bar plots of a film increasing with the pre-reduction temperature, and wherein microwave treatment further increased the water contact angle of the film.

FIG. 16A shows Raman analysis of microwaved G@FAg particles compared with its precursors and the pristine FAg particles.

FIG. 16B shows water contact angle analysis of microwaved G@FAg particles compared with its precursors and the pristine FAg particles.

FIG. 16C shows 24 h-water absorption analysis of microwaved G@FAg particles compared with its precursors and the pristine FAg particles.

FIG. 19A shows flow diameter of mortars disclosed herein.

FIG. 19B shows 3-d and 28-d compressive strengths of mortars disclosed herein.

FIG. 19C shows 3-d and 28-d flexural strengths of mortars disclosed herein.

FIG. 19D shows the relationship between time and water absorption amount in the overall range of mortars disclosed herein.

FIG. 19E shows the initial absorption period analysis of mortars disclosed herein.

FIG. 19F the water sorptivity coefficient of mortars disclosed herein.

FIG. 20A shows SEM-BSE image analysis of plain mortar.

FIG. 20B shows SEM-BSE image analysis of GO@FAg mortar

FIG. 20C shows SEM-BSE image analysis of G@FAg mortar

FIG. 20D shows SEM-BSE image analysis of plain mortar.

FIG. 20E shows SEM-BSE image analysis of) GO@FAg mortar.

FIG. 20F shows SEM-BSE images analysis of G@FAg mortar.

FIG. 20G shows the porosity of the ITZ and paste in each group of mortar, the porosity of the ITZ and paste averaged from three randomly selected areas in mortar samples.

FIG. 20H shows the thickness of ITZ in mortars.

FIG. 20I the relationship between the ITZ porosity and the 28-d compressive strength or water absorption.

FIG. 21A show plots of the Effects of curing age.

FIG. 21B show plots of the effects of drying time on the electrical resistivity of mortars.

DETAILED DESCRIPTION OF THE INVENTION

Figures 1A, 1B, 1C, 1D:
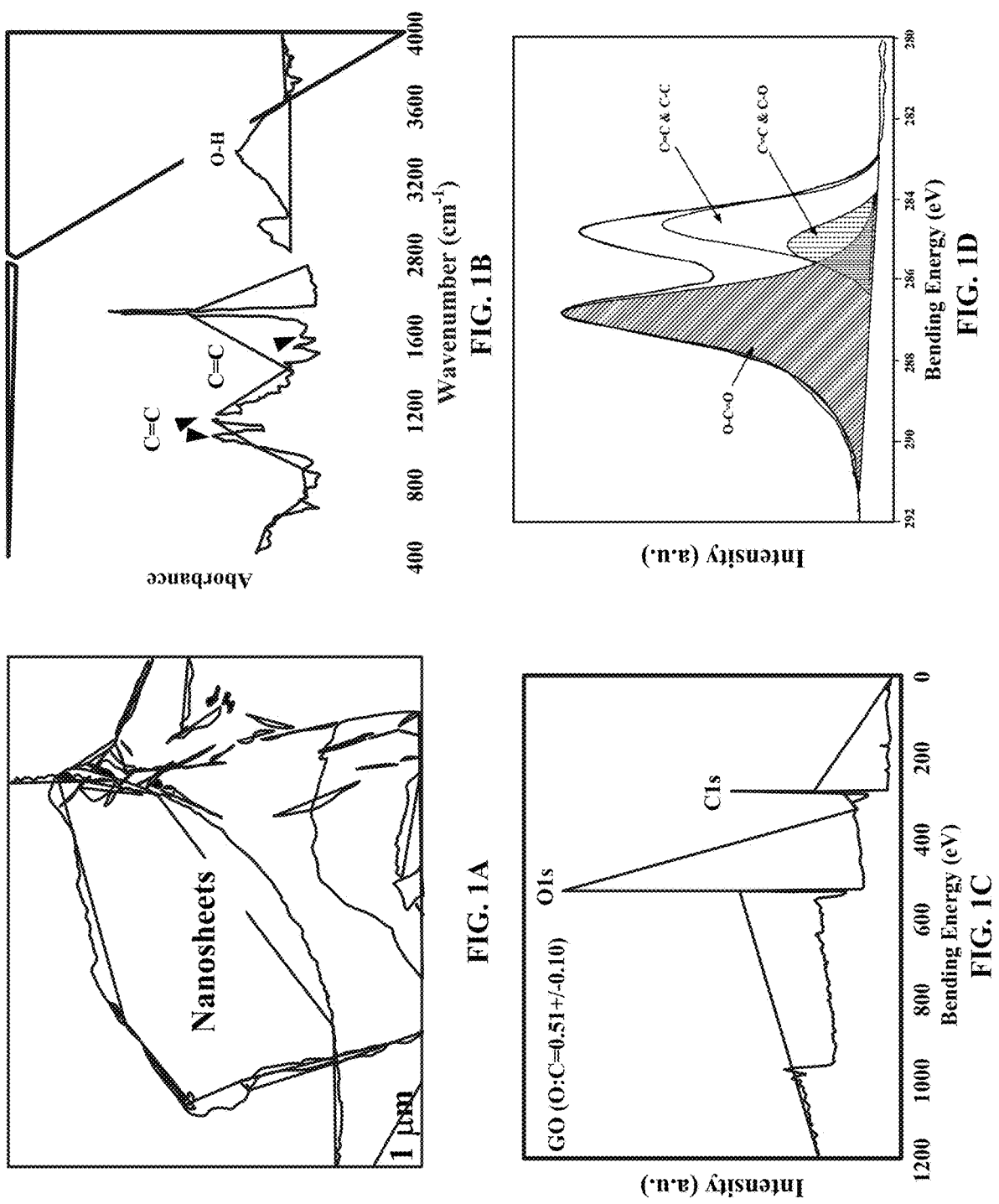
FIG. 1A illustrates a graphical representation of a transmission electron microscope image as part of the characterization of graphene oxide (GO) utilized herein.
FIG. 1B shows FTIR spectra utilized as part of the characterization of graphene oxide (GO).
FIG. 1C shows XPS survey spectra (suggested an O/C ratio of approximately 0.51) as part of the characterization of graphene oxide (GO).
FIG. 1D shows spectrum of graphene oxide (GO) as part of the characterization.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Specific Description

The disclosed embodiments herein utilize novel nano-engineering compositions and methodologies to mitigate the weakness at the interfacial transition zone (ITZ) in cementitious composites. The ITZ zone itself is a weak and thus deleterious interface thick region that often exists between fine aggregates (FAgs) utilized herein and the cement matrix that encompasses the cement mortar and is a zone that significantly influences the performance of cementitious composites. The embodiments herein thus employ GO dispersion to pre-saturate (pre-treat) fine aggregate (FAg) before admixing the FAg with the remainder of the composition.

In addition, the embodiments herein provide for functional mortars prepared using graphene-coated fine aggregate (conductive G@FAg), by a simple method that enables uniform adsorption of graphene oxide onto the surface of FAg particles, followed by simple annealing and microwave treatment. Results indicate that about 62.2% surface area of FAg is covered by graphene, with an average thickness of approximately 8.8 nm. The G@FAg mortar demonstrates outstanding electrical conductivity (resistivity of 960 $\Omega\cdot$cm) and a high fractional change in resistivity of 18% under cyclic compressive loading, which notably outperforms the previously reported mortar by directly adding graphene or carbon nanotubes at the same concentration (0.04%, by weight of cement). The addition of conductive G@FAg particles to the matrix also results in other minor benefits (an 8.7% enhancement in flowability and a 4.0% reduction in water sorptivity).

It is also to be noted that the composites disclosed herein can be provided by steam curing the composites. Generally, the fine aggregate material is pre-adsorbed with a graphene oxide in a range from 0.08 to 0.24 percent by weight of the total weight of the cementitious composition and then steam cured to provide the beneficial composites.

As further detailed infra, fine aggregate materials/particles as utilized herein can include a variety of particles for conductive and non-conductive embodiments disclosed herein to include, but not limited to, natural siliceous sand, carbonaceous sand, dune sand, crushed aggregates such as granite and basalt sand, biochar, air cooled slag, crumb rubber, waste plastics, recycled glass, recycled fine aggregate, reclaimed asphalt pavement, recycled brick, recycled ceramics, mining tailings, coal fly ash or bottom ash, biomass fly ash and other agro-wastes such as groundnut shell, oyster shell, cork, coffee ground, tobacco waste, bagasse ash, and sawdust ash, municipal limestone, industrial wastes such as waste foundry sand, steel slag, copper slag, blast furnace slag, ferrochrome slag, imperial smelting furnace slag, palm oil clinker, solid waste incineration fly ash and/or bottom ash. Because GO promotes cement hydration, the introduction of GO improves the degree of polymerization of hydration products specifically at the ITZ, but in particular, when the FAg is pre-treated with GO before admixing with the remainder of the composition. The embodiments disclosed herein thus disclose a method of operation to effectively introduce GO into cementitious composites so as to enable the precise design of ITZ via nano-engineering as well as provide for conductive composites, the result of which effectively improves the mechanical and electrical properties, and durability performances of the disclosed cementitious composites.

Hereinafter, the embodiments are shown in detail with respect to the following examples. These examples are presented only for the sake of explanation of the invention but should not be interpreted as limiting the scope of the embodiments.

Example 1

Materials and Methods

Materials

The embodiments herein utilize a cement to prepare the cement mortar, such as, for example, Ordinary Portland cement of grade 42.5, The example chemical composition of the cement and its physical properties utilized are as listed in Table 1, wherein LOI=Loss of ignition, measured by the Chinese standards GB/T176-2008. Table 1 also enlists the flexural and the compressive strength of the cement at 3 days (3 d) and 28 days (28 d). The chemical composition analysis done using XRF9, Persee, China indicates that $SiO_2$, $Al_2O_3$, $Fe_2O_3$ and CaO cover more than 96% of the total oxides in the cement used herein.

TABLE 1

| Flexural strength (MPa) | | Compressive strength (MPa) | | Specific surface | Chemical composition (wt %) | | | | |
|---|---|---|---|---|---|---|---|---|---|
| 3 d | 28 d | 3 d | 28 d | area $(m^2/kg)$ | CaO | $SiO_2$ | $Al_2O_3$ | $Fe_2O_3$ | LOI |
| 4.2 | 7.6 | 21.3 | 45.7 | 340 | 65.38 | 22.84 | 4.53 | 3.27 | 3.19 |

The embodiments herein, utilizes an aqueous dispersion (aqueous solution) of Graphene Oxide (GO) and water, wherein the amount of graphene oxide in the aqueous dispersion can vary depending on a desired end product. A surprising result occurs, as disclosed herein, when the amount of graphene oxide in the aqueous dispersion is from about 0.01 to 0.06 percent by weight of the total weight of water and graphene oxide (GO).

To illustrate a beneficial example embodiment, the aqueous dispersion of a single-layer GO was prepared, as shown in FIG. 1A, using, for example, by the modified-Hummers method known to those skilled in the art. The GO utilized herein demonstrated a zeta potential (Zetasizer Nano ZS, Malvern Instrument, UK) of approximately −30 mV at the pH of 7. Attributable to the negatively charged functional groups on its surface. The chemical bonds in the GO herein were tested by Fourier Transform Infrared (FTIR, BRUKER TENSOR II, Germany) spectroscopy.

As can be seen in FIG. 1B, the GO mainly contains the C—O bond, C=O bond, C=C bond, and O—H bond. The surface functional groups pf the GO are characterized herein by an X-ray Photoelectron Spectroscopy (XPS, ESCALAB 250Xi, USA) as presented in FIG. 1C and FIG. 1D, wherein FIG. 1D shows C1s spectrum of GO. The results of the characterization suggested that the major elements are C=66.4 at % and O=33.6 at %.

Example beneficial aggregate materials that can be utilized herein, include, but are not limited to, natural siliceous sand, carbonaceous sand, dune sand, crushed aggregates such as granite and basalt sand, biochar, air cooled slag, crumb rubber, waste plastics, recycled glass, recycled fine aggregate, reclaimed asphalt pavement, recycled brick, recycled ceramics, mining tailings, coal fly ash or bottom ash, biomass fly ash and other agro-wastes such as groundnut shell, oyster shell, cork, coffee ground, tobacco waste, bagasse ash, and sawdust ash, municipal limestone, industrial wastes such as waste foundry sand, steel slag, copper slag, blast furnace slag, ferrochrome slag, imperial smelting furnace slag, palm oil clinker, solid waste incineration fly ash or bottom ash. In the embodiments herein, the aggregate utilized to prepare the cement mortar is a siliceous fine aggregate (FAg) with a maximum particle diameter of 2.0 mm. The size gradation and the physical properties of the FAg are as shown in Table 2 and Table 3 respectively. Physical properties of FAg modified known as modified fine aggregate (MFAg) are also included in Table 3.

TABLE 2

| | Gradation Square mesh size (mm) | | | | | |
|---|---|---|---|---|---|---|
| | 2.00 | 1.60 | 1.00 | 005 | 0.16 | 0.08 |
| Remaining (%) | 0 | 7 ± 5 | 33 ± 5 | 67 ± 5 | 87 ± 5 | 99 ± 1 |

TABLE 3

| Sample | Bulk density $(kg/m^3)$ | Apparent density $(kg/m^3)$ | Water absorption (%) |
|---|---|---|---|
| FAg | 1580 | 2630 | 1.9 |
| MFAg | — | — | 1.6 |

FAg Pre-Saturated by GO Suspension

Figure 2:
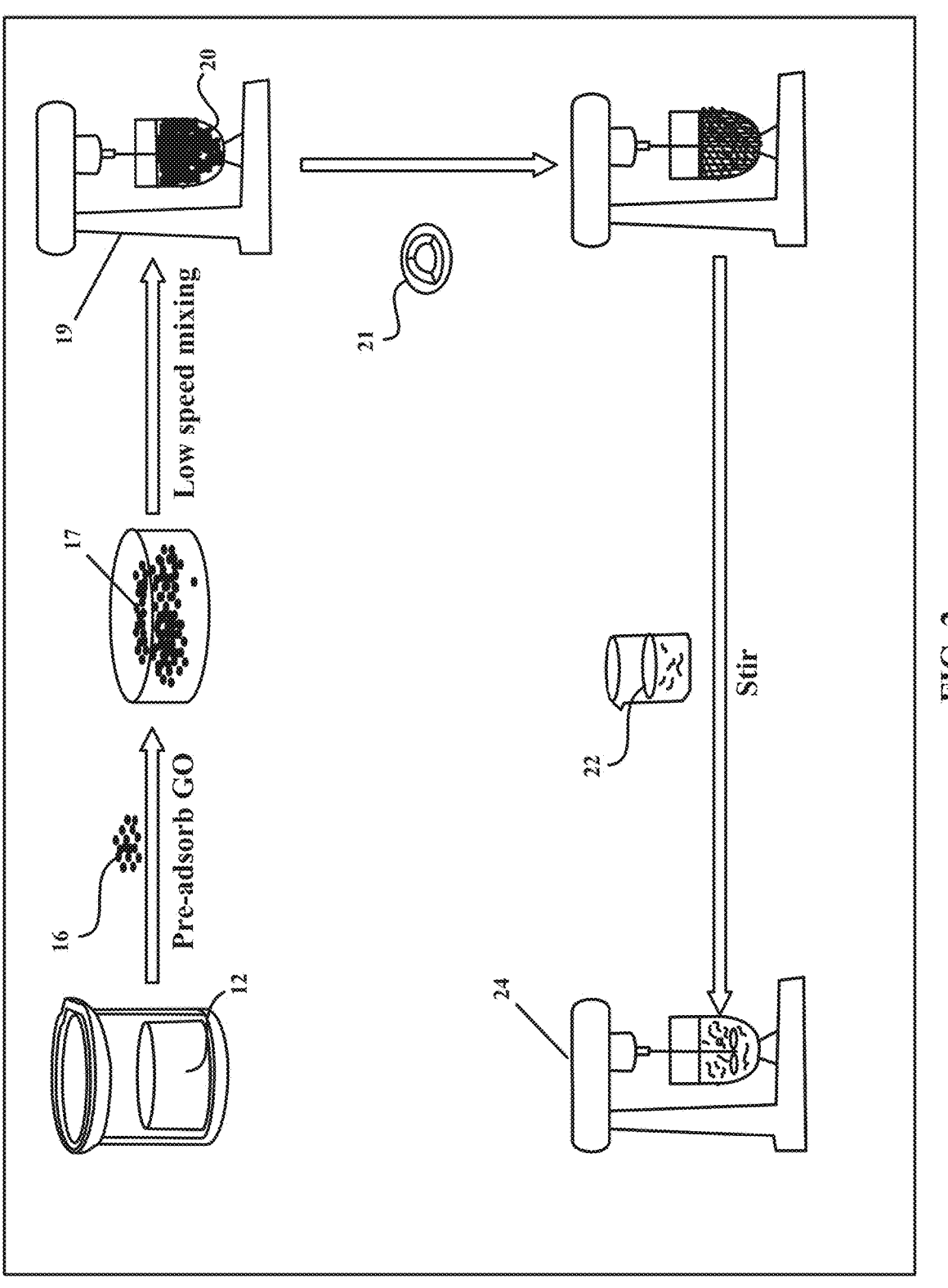
FIG. 2 shows a basic schematic of the cement mortar fabrication process of the present invention.
Figures 3A, 3B, 3C, 3D, 3E, 3F:
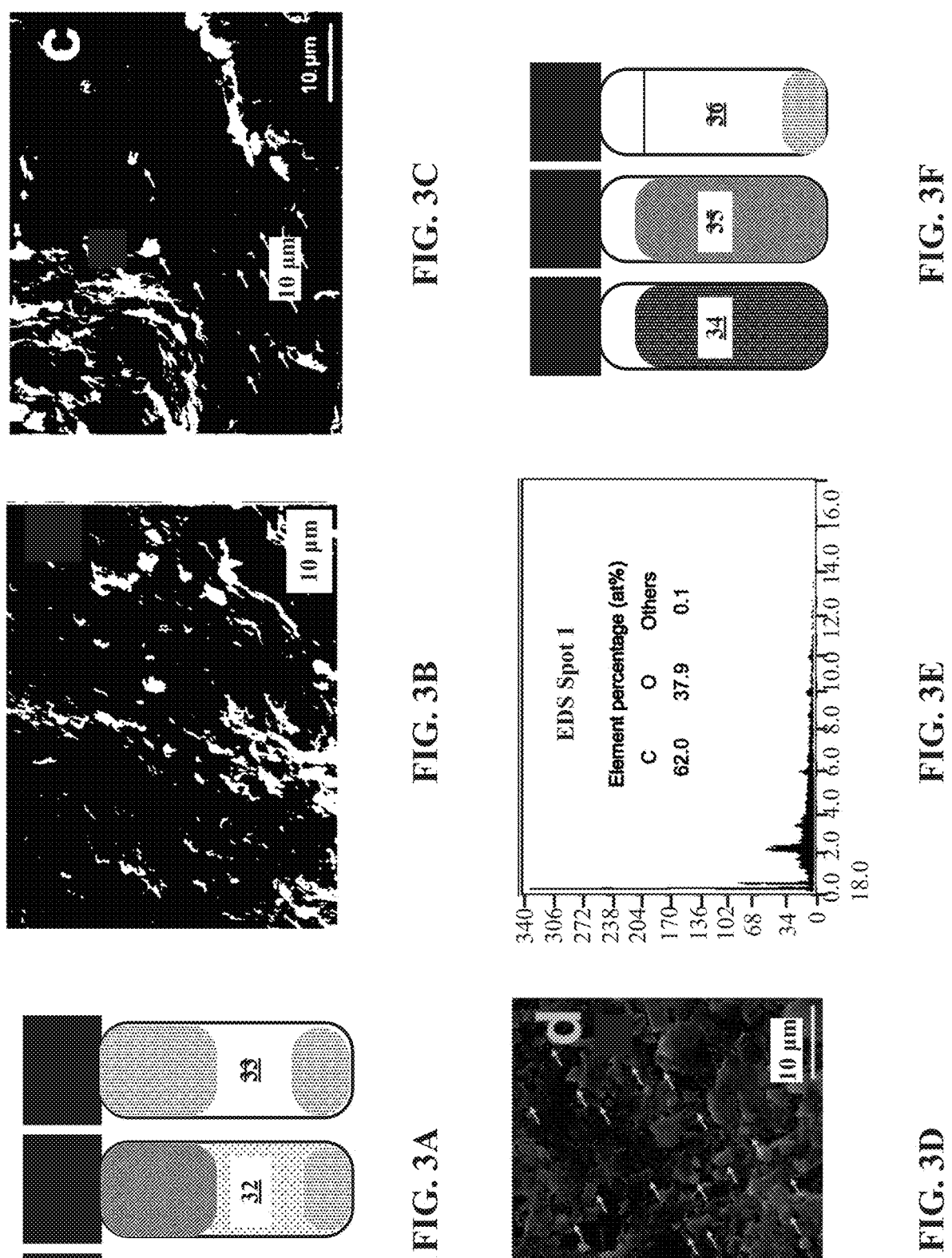
FIG. 3A shows GO-aggregates interaction analysis. Specifically.
FIG. 3B also shows GO-aggregates interaction analysis. Specifically.
FIG. 3C also shows GO-aggregates interaction analysis. Specifically.
FIG. 3D also shows GO-aggregates interaction analysis. Specifically.
FIG. 3E also shows GO-aggregates interaction analysis. Specifically.
FIG. 3F also shows GO-aggregates interaction analysis. Specifically.

Turning back to the drawings, FIG. 2 represents a basic schematic of the cement mortar fabrication process, as disclosed herein. A dark yellowish appearance of the MFAg in the real mages (not shown) revealed relatively uniformity, implying successful adsorption of GO on the surface of aggregate particles.

In an example method of operation, a graphene oxide (GO) suspension 12 was first prepared using instruments known in the art, such as, an industry ultrasonic instrument (22.5 L, 30 kHz, 200 W, KH-500DE) for up to about 30 min with the assistance of a superplasticizer (SP) as the dispersant. A fine aggregate (FAg) 16 was then directly immersed in the GO suspension 12 without any pre-treatment for a time (e.g., 2 h) 17 followed by shear mixing 19, such as, for example, mixing at a speed of ~200 rpm/min for 2 min. A modified fine aggregate (MFAg or GO-MFAg hybrid) 20 resulted. Analyses of scanning electron microscopy (SEM) (not shown) and energy-dispersive spectrometry (EDS) of the surface of the MFAg revealed that the GO nanosheets were well adsorbed on the surface of aggregates (i.e., Element (at %), Carbon (C) 68.9%, Oxygen (O) 26.3%, Others 4.8%). The water content in the MFAg was considered as part of the mixing with water for the calculation of the water/cement (w/c) ratio in the fabricated cement mortar. Cement 21, GO-MFAg 20, and the remaining amount of mixing water 22 were then mixed by mechanical shearing 24. For comparison, pristine mortar without GO addition (labeled as control mix), as well as GO-modified mortar (obtained by directly mixing cement, GO, and FAg together) were also prepared (see below in Table 4). The fresh mixture was cast into steel molds and vibrated on a vibration table for a time of at least 2 min to ensure good compaction. The samples were demolded at 24 h after casting and kept in a standard curing room (temperature: 20° C.±2° C.; relative humidity: >95%) before testing.

TABLE 4

| Mix code | Cement (g) | FAg (g) Untreated | FAg (g) Modified | GO (%) | Hybrid system |
|---|---|---|---|---|---|
| 0GO-FAg | 450 | 1350 | 0 | — | Cement + FAg |
| 0.05GO-FAg | 450 | 1350 | 0 | 0.05 | Cement + GO + FAg |
| 0.05GO-MFAg | 450 | 0 | 1350 | 0.05 | GO-MFAg + Cement |

Testing Programs in the Laboratory

Mechanical Testing

The flexural strength of the cement mortar was tested, using, for example, a three-point bending test at a loading rate of (50±10) N/s according to GB/T 17671-1999. The final value was determined by the average readings of test results of triplicate specimens. For the compressive strength test, the loading rate was (2400±200) N/s according to GB/T 17671-1999. The ultimate compressive strength values were obtained by the average of six replicate samples for each mix design.

Water Absorption Testing

A water sorptivity test was employed to characterize the water absorption of cement mortar. At first, the specimen was used as a 50 mm thick slice cut from the middle part of cement mortars. Subsequently, the specimen was oven-dried at 60° C. for 24 h to remove any moisture inside it. Finally, the top surface of the specimen was covered with plastic wrap and the side surface was sealed with tape to make sure that only the bottom surface was in contact with water. The water absorption of the specimen was calculated by the following equation (1):

$$I = \frac{M_t}{A \times D} \quad (1)$$

where I is the water absorption (mg/cm$^2$), $M_t$ is the change in specimen mass at the time t (g), t is the time (s), A is the exposed area of the specimen (mm$^2$), and D is the density of water (g/mm$^3$).

Microscopic Investigation

The following investigations aimed to unravel the mechanism underlying the strength improvement and ITZ enhancement in the cement mortar incorporating the GO-MFAg hybrid. For this purpose, the secondary electrons (SE) mode and the back-scattered electron (BSE) imaging mode in SEM (TESCAN VEGA3 XMU) analysis, SEM-EDS, Mercury intrusion porosimetry (MIP, Autopore IV 9500, Micromeritics Instrument Corp., USA), X-ray Diffraction (XRD, SmartLab, Rigaku, Japan) and Fourier transform infrared spectrometry (FTIR, BRUKER TENSOR II, Germany) were employed to characterize the materials or interfaces of interest.

For XRD and FTIR measurements, the dry powders (e.g., ~45 µm in diameter) were produced by grinding the selected crushed samples. XRD measurement was performed with Cu Kα radiation (λ=1.54 Å), using constant pass energy (40 kV and 35 mA). The diffraction patterns were obtained at a scanning rate of 10 degrees/min in the 2θ range of 5-70 degrees. The potential chemical interactions between the GO-MFAg hybrid and cement matrix were investigated by FTIR. Firstly, non-sample FTIR scans were conducted to filter possible noise signals. After that, the FTIR scans of the powder samples were performed with a frequency range of 400-4000 cm$^{-1}$.

The total porosity and pore size distribution of the cement mortar were determined using MIP. For intrusion porosimetry (MIP) measurements, the samples were selected from the inner part and cut into ~30 pieces of cubic particles with a diameter of approximately 3 mm. They were soaked in ethanol to stop hydration and then dried at 60° C. in an oven for 48 h before the examination. The applied intrusion pressures were set from 1.4 KPa to 414 MPa.

The cement mortar was investigated by SEM-EDS and SEM-BSE to reveal their properties of ITZ and determine the elemental composition. At first, the collected samples were immersed in ethanol to stop hydration. Subsequently, they were oven-dried at 60° C. for 48 h and gold-coated before testing. Finally, a typical 20 kV accelerating voltage was used. The thickness of ITZ was measured by Nano Measurer 1.2 software. The SEM-BSE analysis was conducted to gain a deeper understanding of the pores and hydrates of ITZ using image software.

Results

Interaction Between the GO and the FAg

The enhancement of the ITZ by pre-saturating the FAg can be readily implemented in practice, due to its easy operation, low cost, and effectiveness. Considering the fact that GO can accelerate and promote cement hydration as known by those skilled in the art. GO dispersion was employed herein to pre-saturate the FAg, to specifically engineer the ITZ on the surface of FAg at the nanoscale. The dark appearance (dark yellowish) of the MFAg was relatively uniform, implying successful adsorption of GO on the surface of FAg, which was further confirmed by analyses of SEM image and EDS analysis.

It is to be noted that the GO-aggregates interaction presented herein details the behaviors of FAg pre-saturated by GO solution. An experiment was designed and conducted as presented herein to shed light on this interaction. As such, a two-layer immiscible liquid of GO solution combined with dichloromethane 31 was prepared. The 0.05 wt % GO or the GO mixed with cement pore solution was placed on top of dichloromethane, due to the difference of density. Since GO nanosheets are super-hydrophilic, they would rather stay in the water, and it is thermodynamically unfavorable for them to diffuse into dichloromethane. Then, FAg particles were gradually dropped into the vial, transported sequentially through the two liquid layers, before their eventual settling-down on the bottom of the glass bottle.

It is to be noted that when the FAg particles transport across the GO due to gravitational force, they adsorb a layer of GO on their surface if the GO-aggregates interaction is strong enough. Otherwise, the physically adsorbed GO is peeled off once in contact with dichloromethane. After the FAg sedimentation test, the color of the GO solution was lightened 32 and 33 (see FIG. 3A), especially for the GO solution containing cement pore solution 33. This observation indicated the adsorption of a significant amount of GO nanosheets onto the FAg particles and the GO-aggregates interaction improved in the alkaline cement pore solution. FIGS. 3B, 3C, 3D and 3E respectively represent SEM images and EDS analysis that support the observation that a thick layer of GO film is tightly and uniformly coated on the FAg particles, indicating strong GO-aggregates interaction that would sustain in the alkaline cementitious matrix.

As the color and solid content of the GO solution can indirectly reflect the amount of adsorption on the surface of the FAg. Accordingly and s part of an experimental procedure, a PTFE membrane was used to filter out the GO aqueous solution soaked in the FAg particles. Visual observation, as graphically shown by reference character 35 in FIG. 3F, indicated that the color of the GO solution 35 was lighter. Surprisingly and interestingly, the GO adsorbed on the FAg surface did not seem to be peeled off when immersing the MFAg particles in deionized water 36, indicating a strong GO-FAg interaction. The content of GO adsorption on the surface of the FAg was estimated by the concentration difference of GO dispersion before and after soaking FAg. Approximately 87.9% of GO nanosheets were adsorbed on the surface of FAg, while the rest of approximately 12.1% of GO nanosheets were freely dispersed in water and introduced into the cementitious matrix.

Mechanical Properties

Figure 4A:
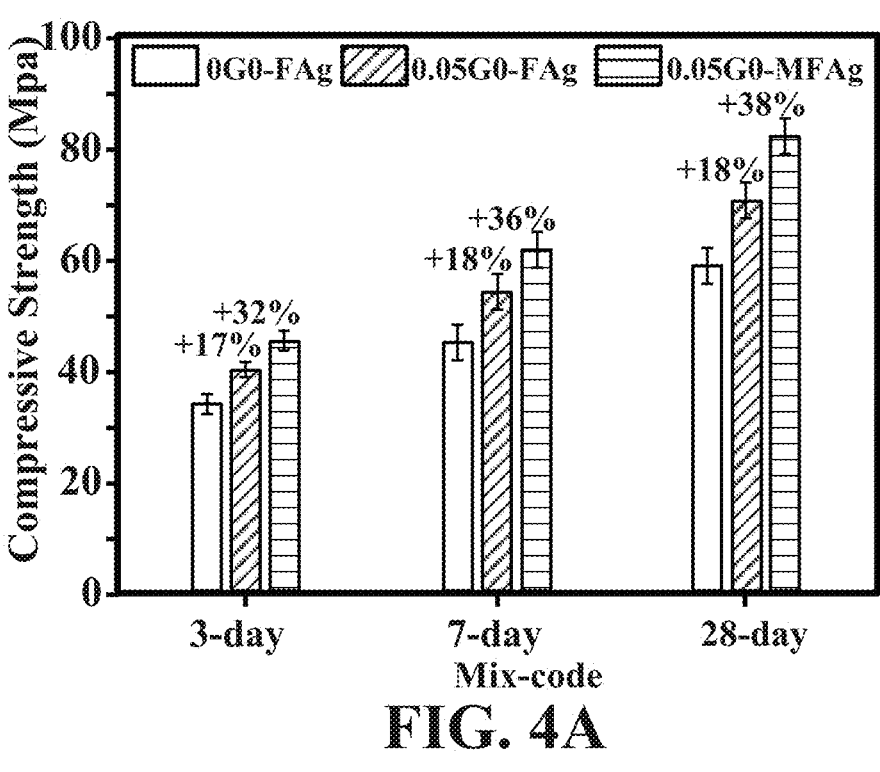
FIG. 4A shows compressive strength mechanical properties of cement mortars disclosed herein cured at 28 days.
Figure 4B:
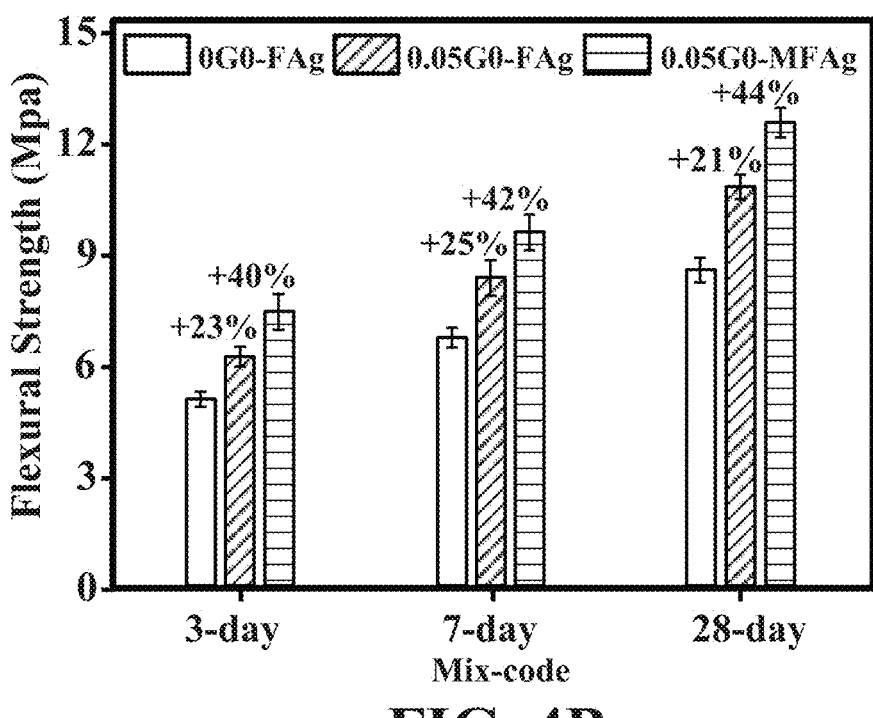
FIG. 4B shows flexural strength mechanical properties of cement mortars disclosed herein cured at 28 days

FIG. 4A depicts the average compressive strength of cement mortars without GO which were 34.4 MPa (3-day), 45.7 MPa for (7-day) and 58.6 MPa for (28-day), respectively. As 0.05 wt % GO was admixed, the compressive strength increased by approximately 20%, relative to the 0GO-FAg. Surprisingly and unexpectedly, the introduction of the GO-MFAg hybrid notably increased the 28-day compressive strength of the cement mortar by 38%, and significantly higher than that of 0.05GO-FAg. Similarly, the 28-day flexural strength of the cement mortars 0.05GO-FAg and 0.05GO-MFAg were 9.8 MPA and 12.7 MPa, surprisingly and also unexpectedly represented an increase of approximately 21% and 44%, respectively, relative to the 0GO-FAg sample, as shown in FIG. 4B.

Flexural strength enhancements of cement composites are related to either template effect of GO nanosheets, barrier effect against microcracks propagation and improved C-S-H nucleation by surfaces of the GO. It has been shown herein that the microcracks were forced to tilt and twist around the GO, due to the barrier effect of the GO nanosheets. The admixed GO linked the hydration crystals and facilitated the transfer of load resulting in better mechanical strengths. Moreover, the presence of GO induced the formation of flower-like crystals leading to a crosslinking structure between gaps and improving the toughness of cement composites.

The enhancement efficiency is defined in equation (2) as:

$$E_\phi = \frac{(\sigma_1 - \sigma_2)/\sigma_2}{\phi} \tag{2}$$

where $E_\phi$ is the enhancement efficiency, $\sigma_1$ and $\sigma_2$ are the mechanical strengths of 0.05GO-MFAg and 0GO-FAg, respectively, and $\phi$ is the GO content (by weight of cement).

Figures 4C, 4D:
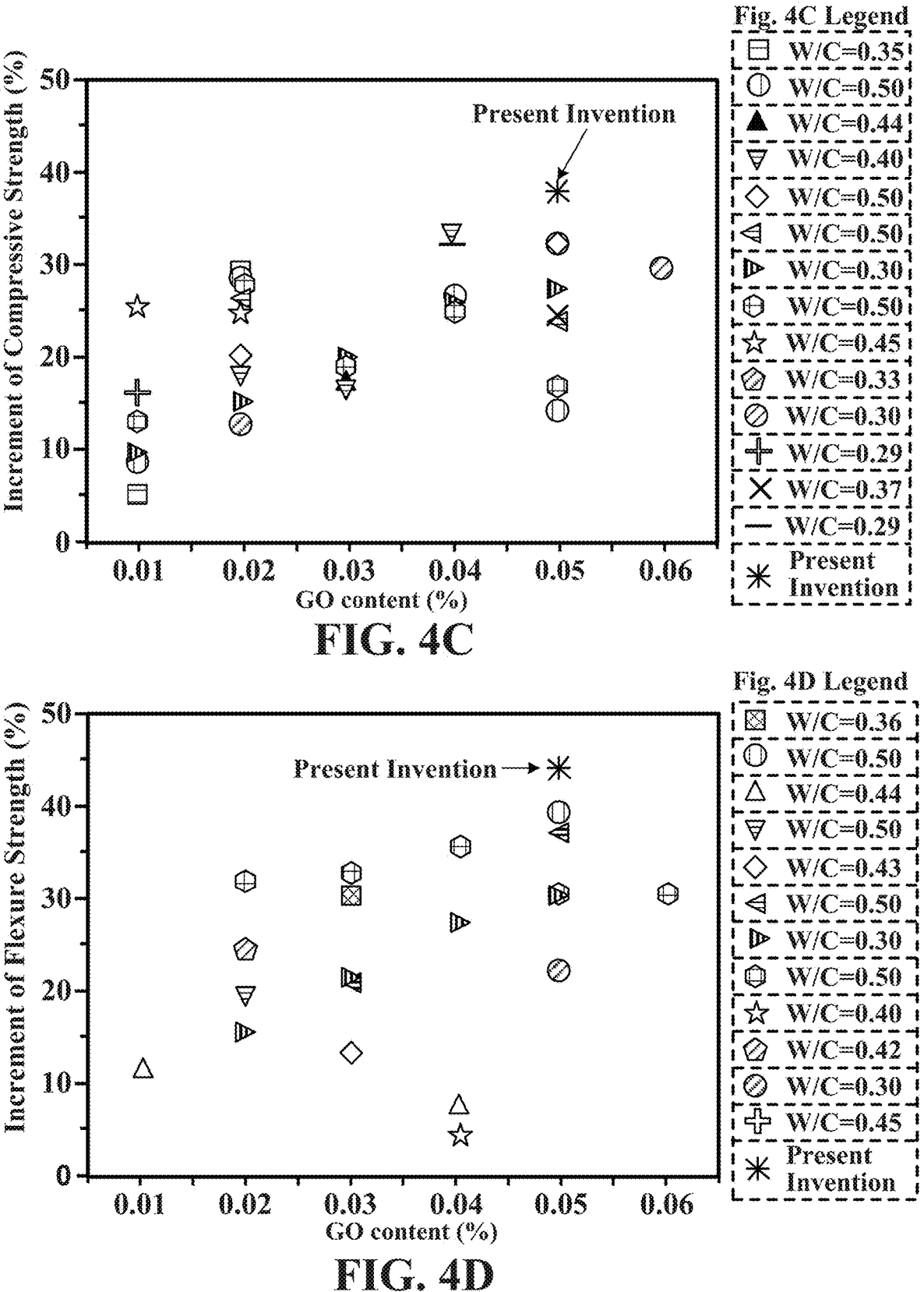
FIG. 4C shows increment of compressive strength mechanical properties of cement mortars disclosed herein cured at 28 days.
FIG. 4D shows increment of increment of flexural strength mechanical properties of cement mortars disclosed herein cured at 28 days.

Further on comparing the enhancement efficiency as defined by equation (2) of the 0.05GO-MFAg to the experimental results, it was discovered in an additionally surprising and unexpected fashion that the 0.05GO-MFAg sample resulted in approximately an enhancement efficiency of 770% and 890% for the 28-day compressive strength and flexural strength, as respectively shown in FIG. 4C and FIG. 4D. These results of the present invention make the 0.05GO-MFAg mortar one of the most effectively reinforced nanocomposites to date.

Considering that not all GO nanosheets are adsorbed tightly on the surface of FAg, a part of the GO was also utilized to reinforce the bulk cementitious matrix, instead of specifically modifying the ITZ. The contributions of GO to the ITZ and cementitious matrix, the chemistry and microstructure of ITZ of cement mortars was thus established. Assuming that the strength of cement-GO nanocomposites can be enhanced linearly with the weight percentage of GO, the contribution of ITZ modification for the strength improvement was estimated. Since the GO dispersion quality in sample 0.05GO-FAg is worse than that of 0.05GO-MFAg, the reinforcement efficiency for the cementitious matrix in the case of the former should be lower than the latter. As such, for the strength enhancement contribution of GO to the cementitious matrix, a typical reinforcement efficiency is 14.2-32.0% by GO. Accordingly, the strength enhancement contribution from ITZ modification is from a range of 54.8% to 74.7%.

Pore Structure Analysis

For cement-based materials, mechanical and transport properties are often governed by their pore structure. for example, porosity, pore diameter and morphology. Samples herein were thus thoroughly analyzed by intrusion porosity (MIP) and water absorption to further support the beneficial aspects of the disclosed embodiments. As know by those of ordinary skill in the art, the pore structure of cementitious composites is generally categorized into four types: thin mesopores (5-27 nm), coarse mesopores (27-50 nm), middle capillary pores (50-100 nm), and large capillary pores (>100 nm).

Figures 5A, 5B, 5C:
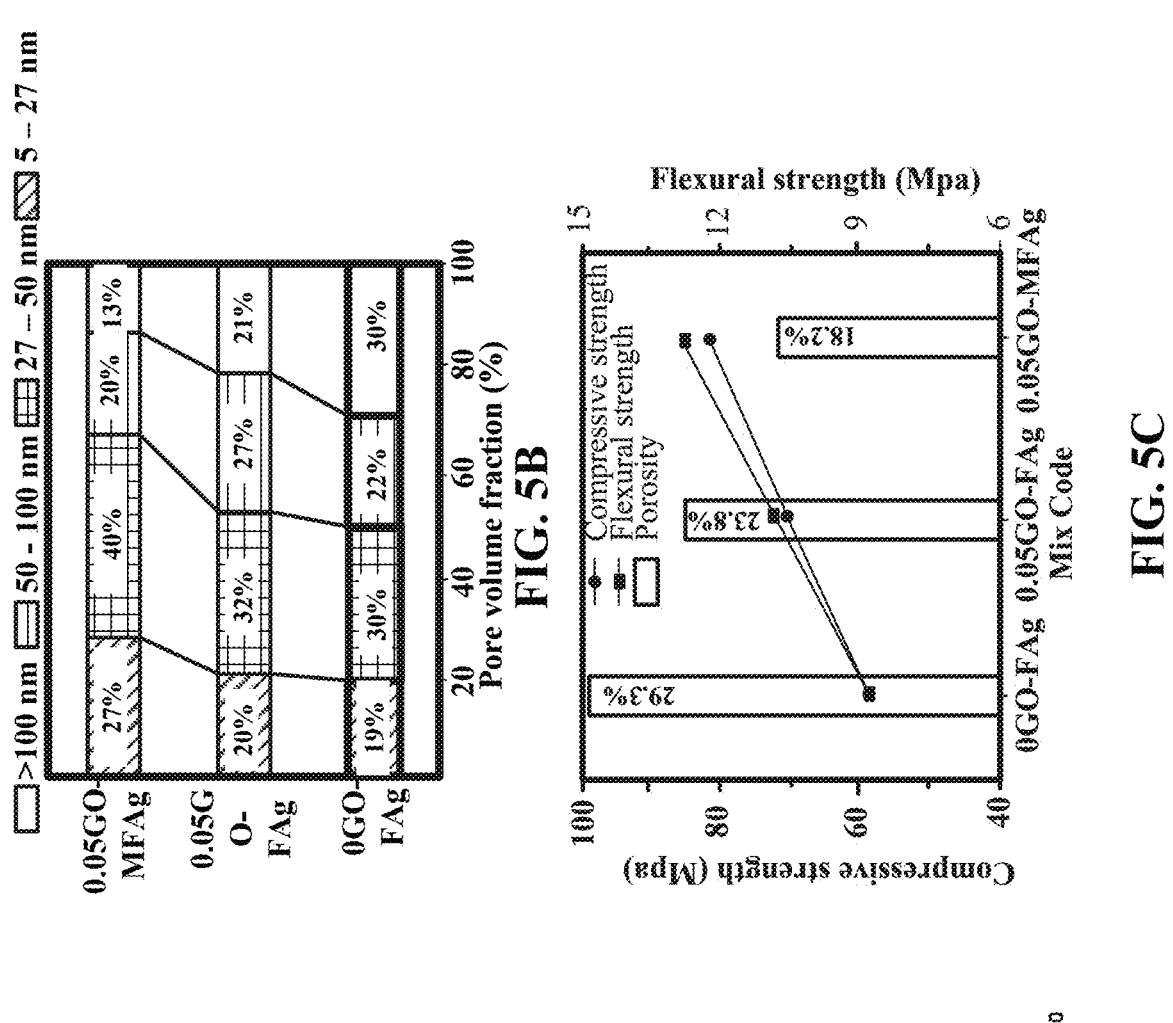
FIG. 5A shows cumulative intrusion and pore size distribution (PSD) of cement mortar specimens cured at 28 days.
FIG. 5B shows pore volume fraction of cement mortars.
FIG. 5C shows the relationship between mechanical strengths and porosity of the embodiments herein.

Again turning back to the figures, FIG. 5A presents the cumulative intrusion and pore size distribution (PSD) of cement mortar specimens cured at 28 days. The addition of the GO-MFAg hybrid of the embodiments herein resulted in an increasing shift of the cement composites towards a finer pore structure. To better illustrate, the 0.05GO-MFAg mortars featured more thin-micropores (27%, 5-27 nm) and fewer large capillary pores (13%, >100 nm), relative to the 0.05GO-FAg (20% and 21%, respectively) or 0GO-FAg (19% and 30%, respectively) mortars, as shown in FIG. 5B.

Table 5 represents the values of calculated pore structure parameters based on the MIP results, which reveal that the 0.05GO-MFAg mortar featured the lowest total porosity (18.2%), compared with hat of the 0.05GO-FAg (23.8%) or 0GO-FAg (29.3%) mortars. Table 5 also shows that the 0.05GO-MFAg mortar featured the lowest average pore diameter (34.0 nm). This observation is consistent with the aforementioned improvements in the mechanical strengths of cement composites as shown in FIG. 5C.

TABLE 5

| Mix Code | Average pore diameter (nm) | Total intrusion volume (mL/g) | Porosity (%) |
|---|---|---|---|
| 0GO-FAg | 38.2 | 0.18 | 29.3 |
| 0.05GO-FAg | 37.6 | 0.14 | 23.8 |
| 0.05GO-MFAg | 34.0 | 0.09 | 18.2 |

Results also indicated the benefits in slowing down the ingress of deleterious species (e.g., $CO_2$, $H_2O$, chlorides, and sulfates) into the mortar or concrete. It is to be noted that a significant part of the GO was adsorbed on the surface of FAg in the sample of 0.05GO-MFAg, the residual amount of GO that could be directly mixed with cement should be much lower than that of the 0.05GO-FAg sample. The lower porosity of 0.05GO-MFAg mortar (relative to 0.05GO-FAg) is likely a result of the nano-engineered ITZ as well as better dispersion quality of GO throughout the cementitious matrix because of the ball-milling effect.

Figure 6:
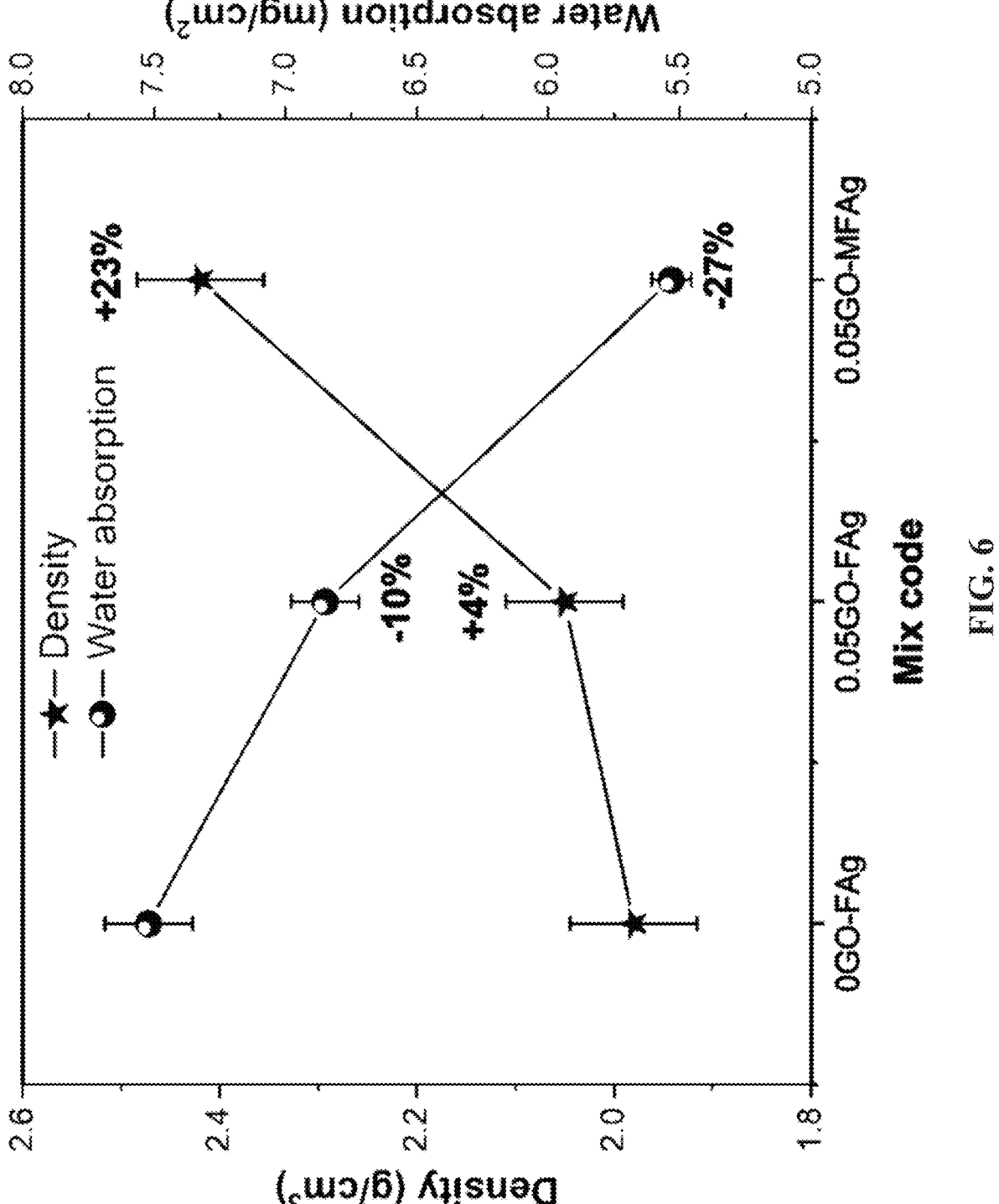
FIG. 6 shows density and water absorption of cement mortar specimens cured at 28 days.

A water absorption test was further employed to observe the microstructure of ITZ, because the water absorption behavior of cementitious composites is highly dependent on the porosity of ITZ, due to wall effects. Besides, the density data revealed that the 0.05GO-MFAg mortar achieved the highest density value (2.42 g/cm³), relative to its 0GO-FAg or 0.05GO-FAg counterparts as shown in FIG. 6. Given no significant changes in the constituent materials or proportioning, a higher density of cement composites is known to be associated with lower water absorption and better physical properties. It was also interesting to note that the 0.05GO-FAg mortar exhibited only slightly lower water absorption than the 0GO-FAg mortar, suggesting poor dispersion quality of the GO when directly admixed into the fresh mortar. In contrast, the admixing of GO-MFAg hybrid (0.05GO-MFAg) decreased the water absorption by 27%, confirming the benefit of the targeted approach to nano-engineer the ITZ in improving the transport properties of cement composites.

Microstructure Analysis

Effect of Admixed GO-MFAg on the Morphology of the Cementitious Matrix

A mode of using secondary electrons (SE) in SEM was used to shed light on the influence of admixed GO-MFAg hybrid on the morphology of key constituent phases in the cement mortars (materials) disclosed herein. As illustrated, the edges of the microcracks (as denoted by arrows) in the 0.05GO-FAg (FIG. 7B) and 0.05GO-MFAg (FIG. 7C) samples were much rougher than those in the 0GO-FAg (FIG. 7A) sample, translating to higher energy dissipation capability. The rougher crack edges, along with the narrower crack width, translate to higher strengths. Furthermore, a large number of budding flower-like crystals can be observed in the 0.05GO-FAg sample (as indicated by the dashed lines in FIG. 7B) and in the ITZ region in the 0.05GO-MFAg sample (as indicated by the dashed lines in FIG. 7D), because the hydration crystals tend to polymerize and assemble due to the temple effect of GO. Furthermore, a denser structure was observed in the 0.05GO-MFAg (FIG. 7C) as compared to 0.05GO-FAg (FIG. 7B).

This refined microstructure is attributed to the role of well-dispersed GO in regulating the shape and assembly of hydration products. Instead of a wide crack, several narrower cracks (at micron and submicron scales) were observed, indicating the benefit of the GO-MFAg hybrid in regulating the crack propagation and controlling the crack width. Surprisingly and unexpectedly, crosslinked GO nanosheets were found and they tended to form linked clusters and inhibit the propagation of microcracks (see inset in FIG. 7C). The crosslinking of nanosheets provided a higher resistance to microcrack propagation, by increasing the fracture energy required for crack growth.

Figure 8:
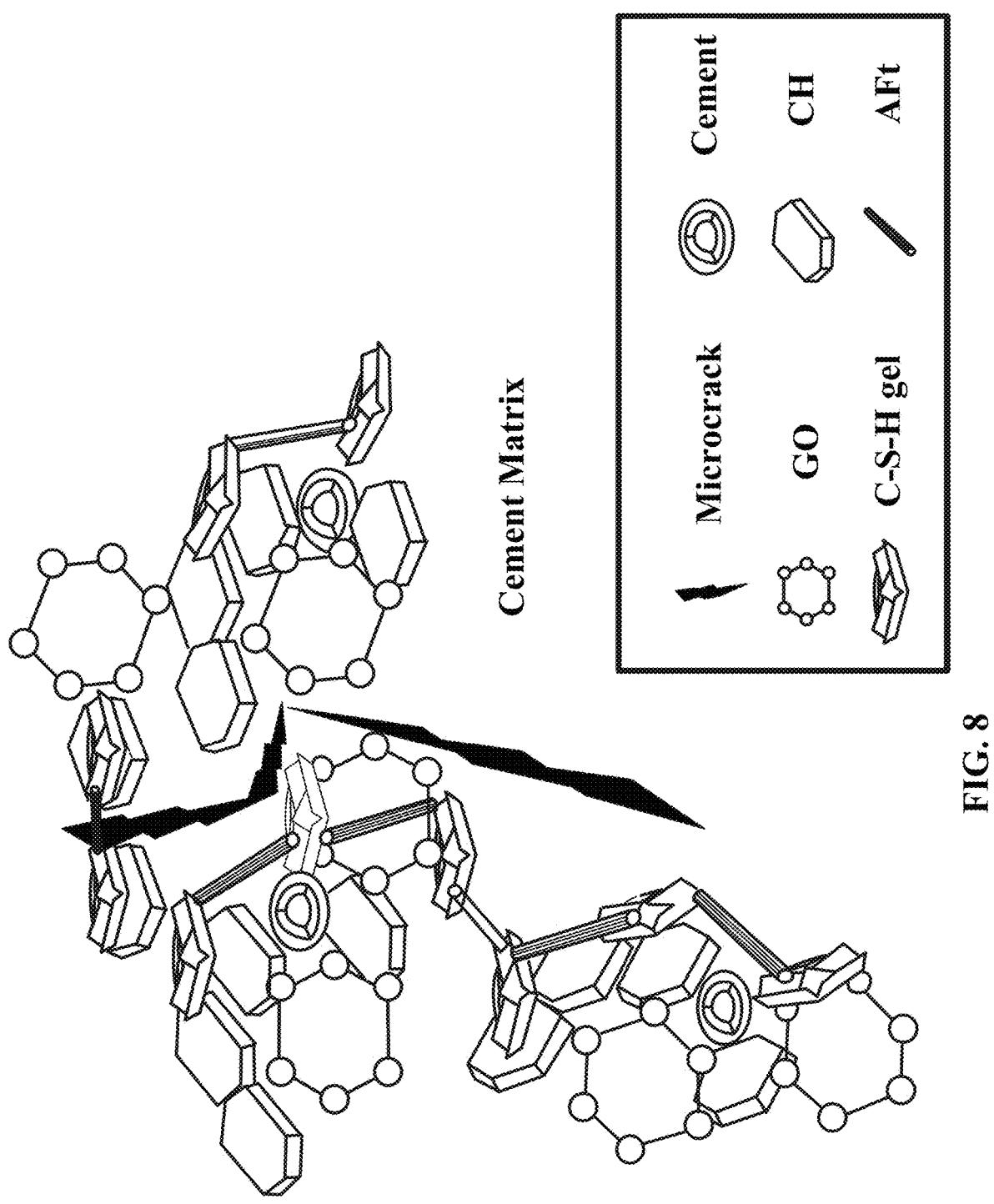
FIG. 8 shows a schematic of the crack deflection in a cement mortar specimen when admixed with GO nanosheets.

In the embodiments presented herein, the microcracks were forced to tilt and twist around the GO instead of propagating and merging in a straight-through manner, as illustrated in FIG. 8. It is to be noted that the large specific surface area and high aspect ratio of well-dispersed GO enable it to better control microcracks than GO agglomerates. This results in higher mechanical strengths of cement mortar when admixed GO-MFAg hybrid (e.g., see FIGS. 4A-4C).

Effect of Admixed GO-MFAg on the ITZ in Cement Composites

In the embodiments presented herein, back-scattered electron imaging and analysis (BSE-IA) is employed to quantitatively analyze the role of GO-MFAg hybrid in cement mortar. As demonstrated in equation (3), different shades of gray were observed, corresponding to different phases with their respective backscattering coefficient (n), which is a function of the atomic number (Z) of the contained pure element. It is to be noted that in a homogenous mixture containing various phases (e.g., cementitious composites), the backscattering coefficient of the mixture ($\eta_{mix}$) is determined by equations (3), (4), and (5).

$$\eta = -0.0254 + 00Z - 1.86 \times 10^{-4}Z^2 + 8.3 \times 10^{-7}Z^3 \qquad (3)$$

$$\eta_{mix} = \sum C_i \eta_i \qquad (4)$$

$$\bar{Z} = \sum_i C_i Z_i \qquad (5)$$

where $C_i$, $\eta_i$, and $Z_i$ are the weight fraction, backscattering coefficient, and the atomic number of the element, respectively. $\bar{Z}$ is the average atomic number of a phase.

Based on the gray level of the BSE images, different phases present in cementitious composites can be clearly distinguished. Typically, a BSE image of hardened cementitious composites demonstrates four main phases, including pores and cracks, C-S-H, CH, and unhydrated cement particles.

Figure 9G:
FIG. 9G shows pores segmented (black pixels) from 0GO-FAg.
Figure 9H:
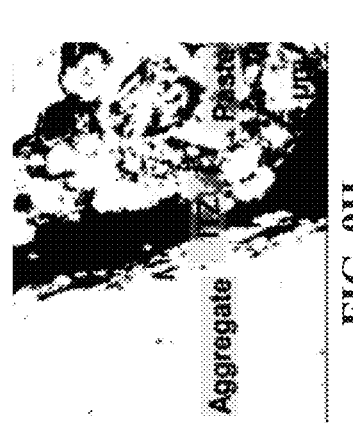
FIG. 9H shows pores segmented (black pixels) from 0.05GO-FAg.
Figure 9I:
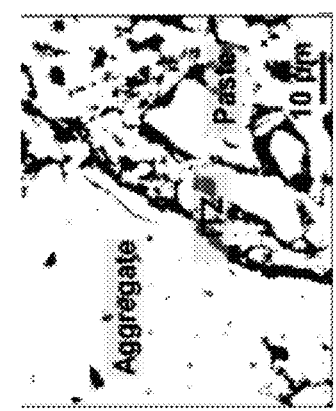
FIG. 9I shows pores segmented (black pixels) from 0.05GO-MFAg.
Figure 9D:
FIG. 9D shows a high magnification image of the interfacial transition zone (ITZ). region of the sample shown in FIG. 9A.
Figure 9E:
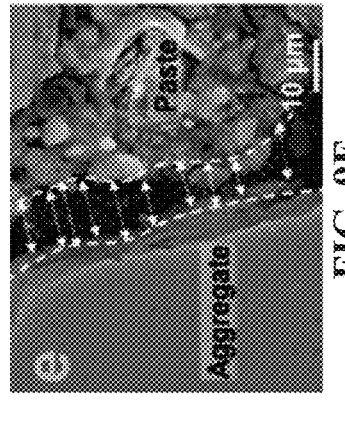
FIG. 9E shows a high magnification image of the interfacial transition zone (ITZ). region of the sample shown in FIG. 9B.
Figure 9F:
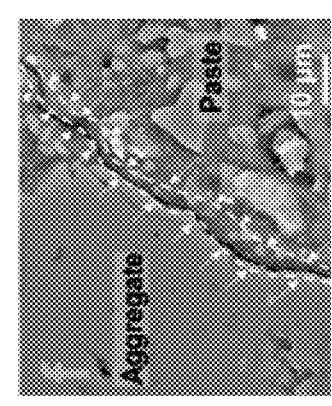
FIG. 9F shows a high magnification image of the interfacial transition zone (ITZ). region of the sample shown in FIG. 9C.
Figure 9A:
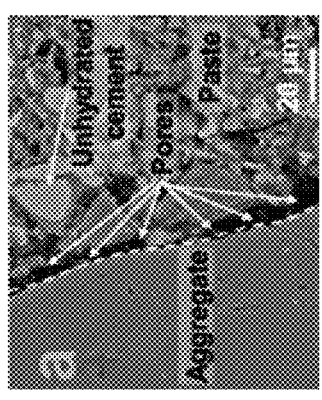
FIG. 9A shows a back-scattered electron (BSE) image of the Interfacial Transition Zone (ITZ) for 0GO-FAg.
Figure 9B:
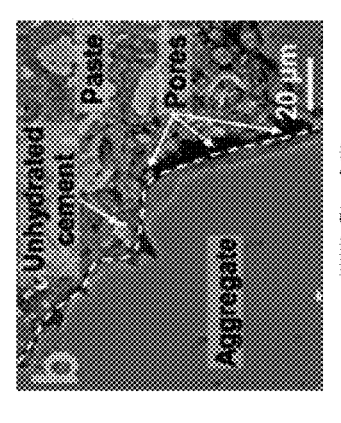
FIG. 9B shows a back-scattered electron (BSE) image of the Interfacial Transition Zone (ITZ) for 0.05GO-FAg.
Figure 9C:
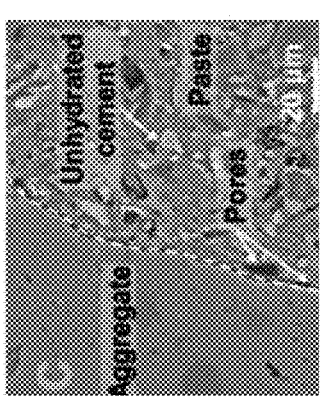
FIG. 9C shows a back-scattered electron (BSE) image of the Interfacial Transition Zone (ITZ) for 0.05GO-MFAg.
Figure 10:
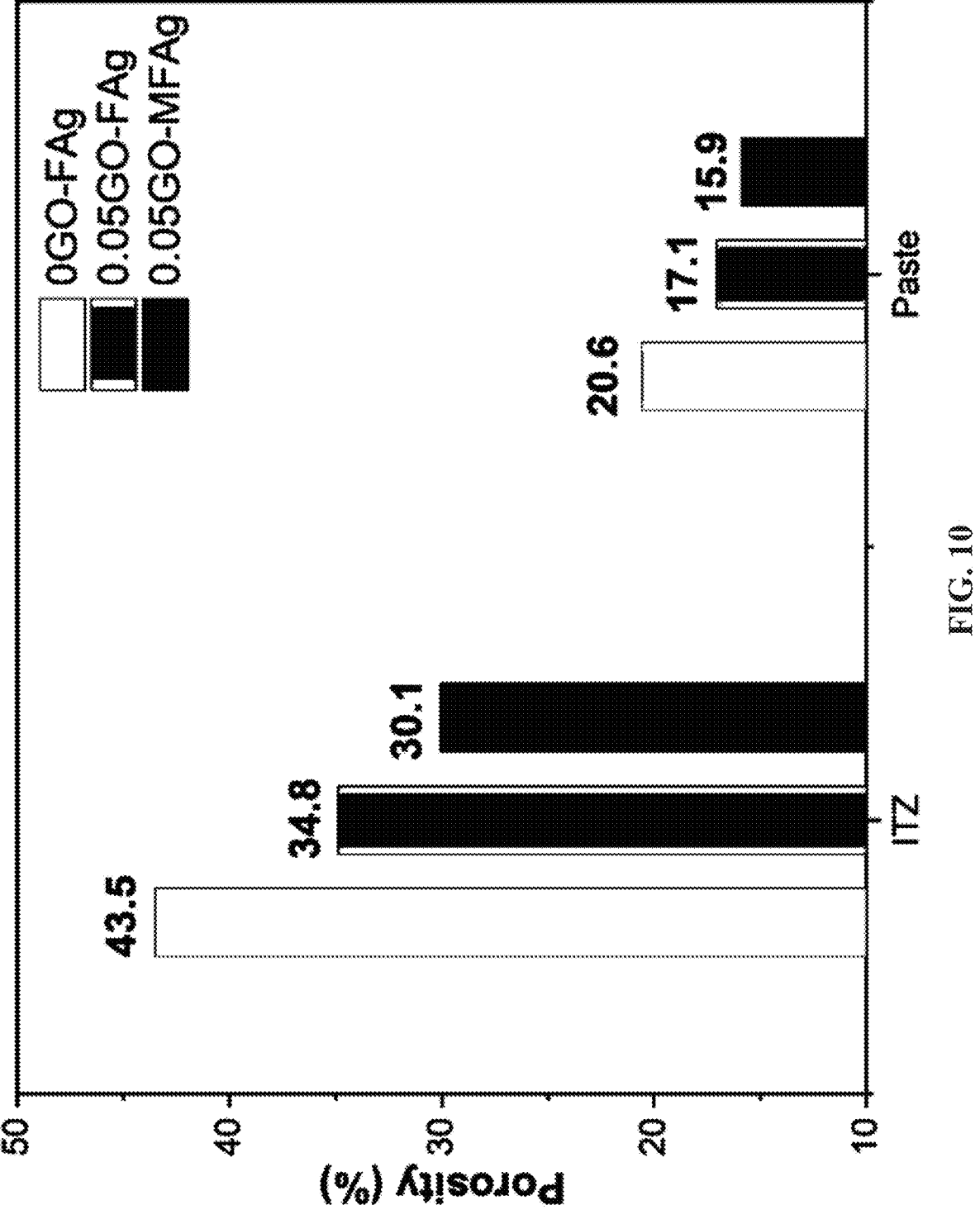
FIG. 10 shows the porosity of the ITZ and paste in three samples. The obtained BSE images with the area of pores segmented.

FIGS. 9A-9I illustrate back-scattered electron (BSE) images of the Interfacial Transition Zone (ITZ) for selected specimens. FIG. 9A is an 0GO-FAg image, FIG. 9B is a 0.05GO-FAg image, FIG. 9C is an 0.05GO-MFAg. FIG. 9D through FIG. 9F are the high magnification of the ITZ regions of the three samples in a-c, respectively. FIG. 9G through FIG. 9I show pores segmented (black pixels) from 0GO-FAg, 0.05GO-FAg, and 0.05GO-MFAg. The arrows indicate the ITZ areas in mortars. Accordingly, a clear gap was found between the FAg and the neighboring paste, and some pores and unhydrated cement particles were also observed in all specimens. The Image software was used to process and quantitatively analyze the porosity of ITZ. Three randomly selected areas in specimens were used to determine the porosity in the ITZ and paste. The ITZ in each specimen featured a higher porosity than the corresponding paste as illustrated in FIG. 10. Due to the wall effect, the ITZ usually features a larger interparticle spacing. Typically, the first cracks due to excessive loading appear in the vicinity of aggregate and strongly influence their fracture behavior. Besides, the porosity in the ITZ decreased from 43.5% (0GO-FAg) to 30.1% (0.05GO-MFAg), i.e., a reduction of 30.8% by the addition of the GO-MFAg hybrid.

Figure 11:
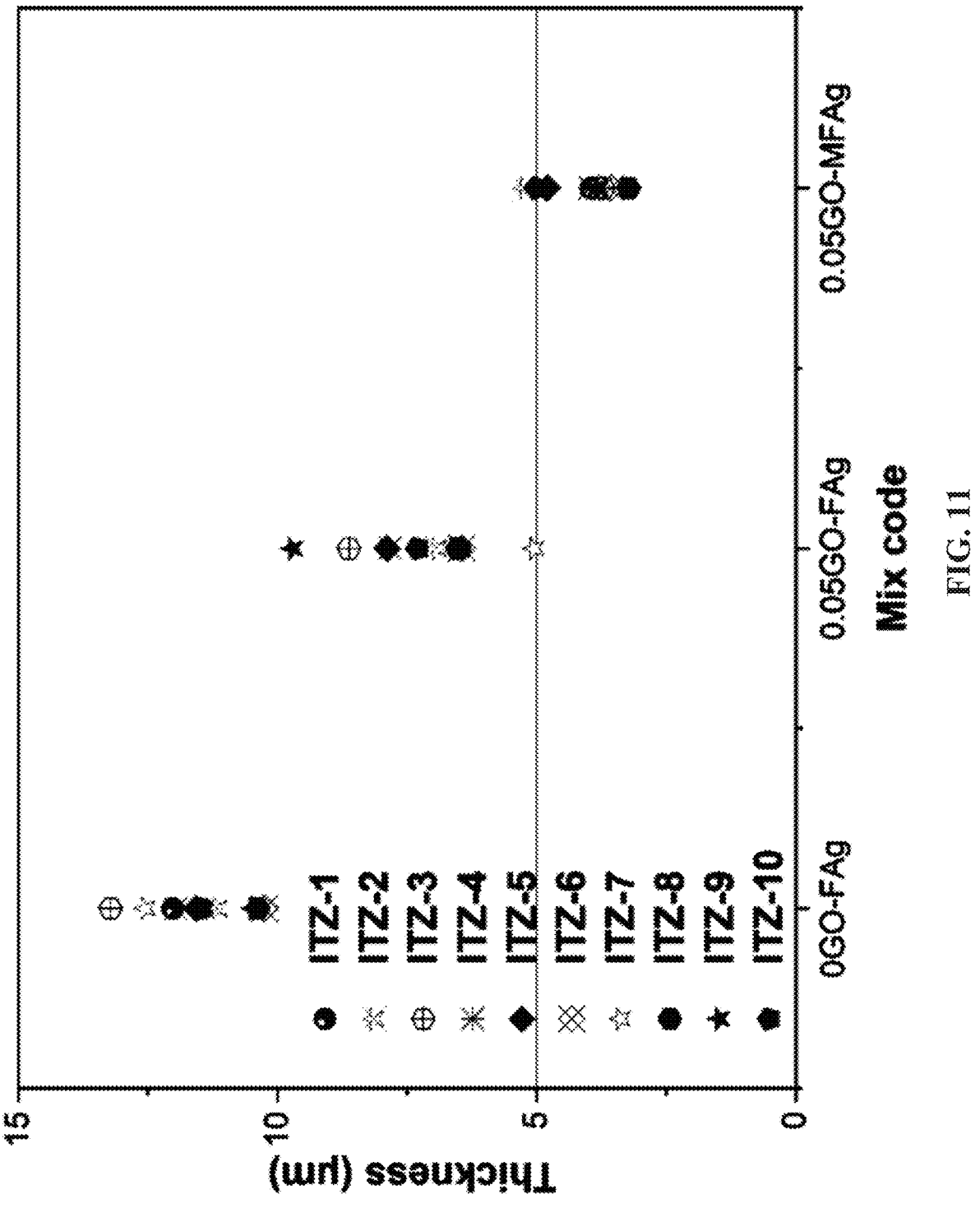
FIG. 11 show thickness results of interfacial transition zone (ITZ) in cement mortars. Measured by Nano Measurer software
Figure 12:
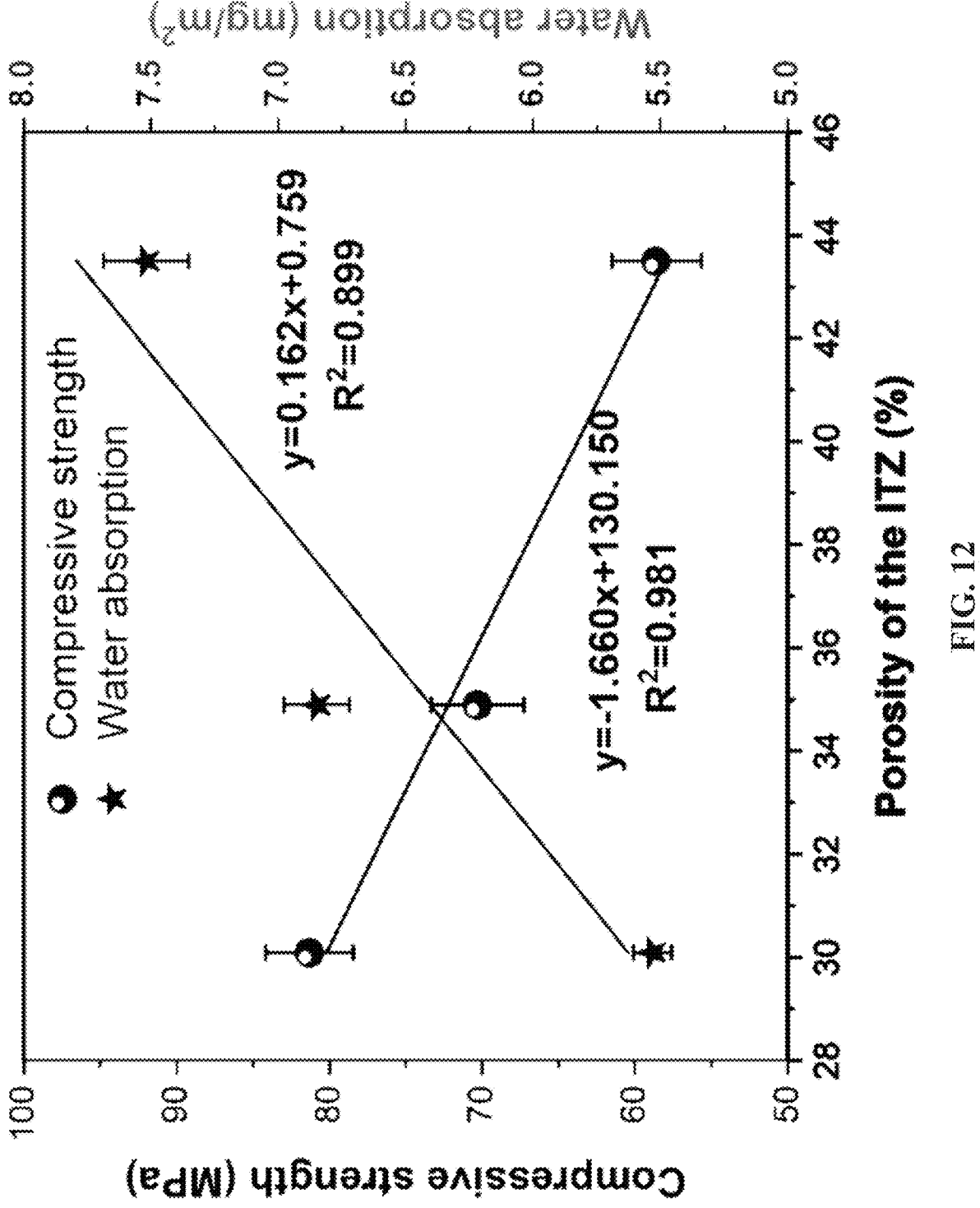
FIG. 12 shows the relationship between the interfacial transition zone (ITZ) porosity and the macroscopic properties of cement mortars.

The thickness of ITZ was estimated from the selected SEM-BSE images with the Nano Measurer software. As indicated in FIG. 11, the ITZ of 0GO-FAg was located in the area within 15 μm from the interface, in which the cement mortar (w/c ratio of 0.35) was approximately 20 μm. As 0.05 wt % GO was admixed directly in the mortar (0.05GO-FAg), the thickness of ITZ was reduced to 5-10 μm. The ITZ for the 0.05GO-MFAg was much narrower and denser, and it is estimated to be only 3-5 μm in thickness, representing an average reduction of about 70%. Overall, the FAg pre-adsorbed by GO refined the ITZ and formed a denser microstructure. Referring to FIG. 12, the correlation between the ITZ porosity and compressive strength is depicted which strongly supports the benefits of nano-engineering of FAg by GO.

Effect of Admixed GO-MFAg on the Chemical Composition of Hydration Products in Cement Composites EDS analysis further sheds light on the effect of admixed GO-MFAg hybrid on the chemical composition of hydration products in the cement mortar. For each specimen, three random ITZ areas (including the one presented in FIG. 9) and ten spots in each area were selected. Another three areas in the paste in each specimen were also randomly selected. As a result, a total of 60 points were collected in each specimen for EDS analysis.

Figure 13A:
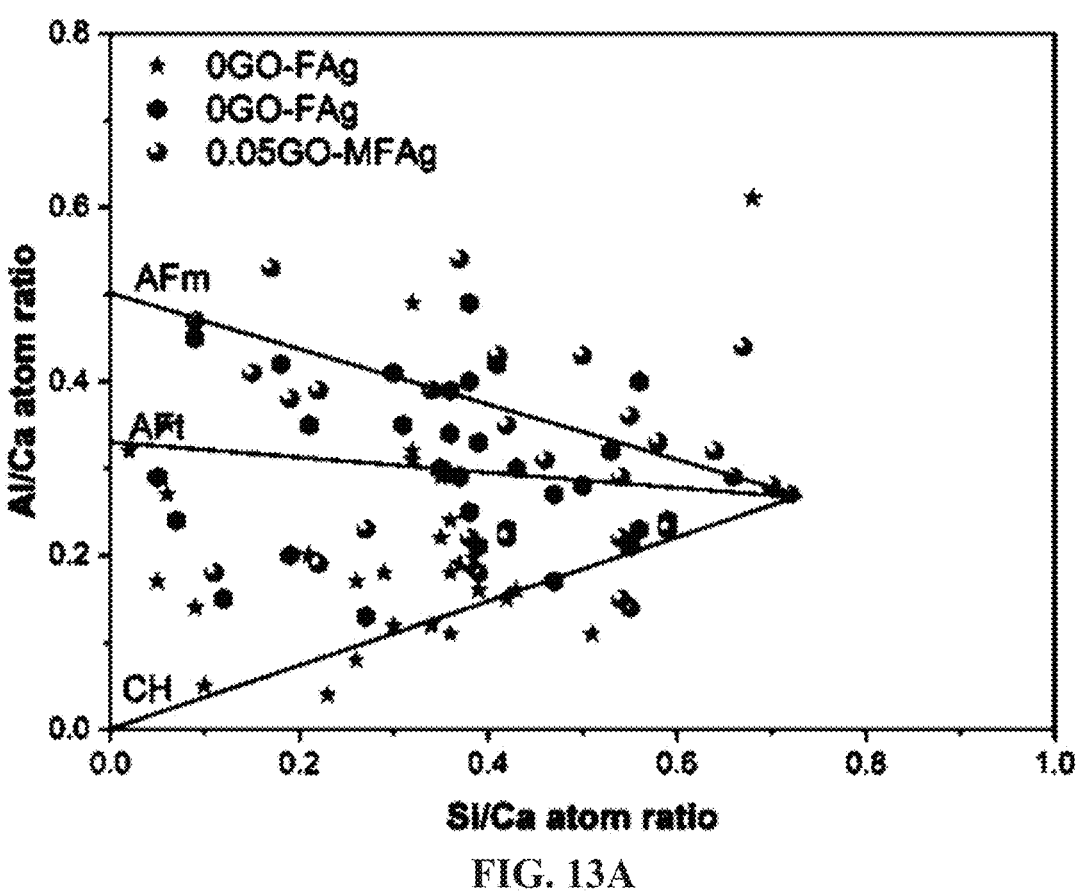
FIG. 13A shows energy-dispersive spectrometry (EDS) spot analysis for the interfacial transition zone (ITZ).
Figure 13B:
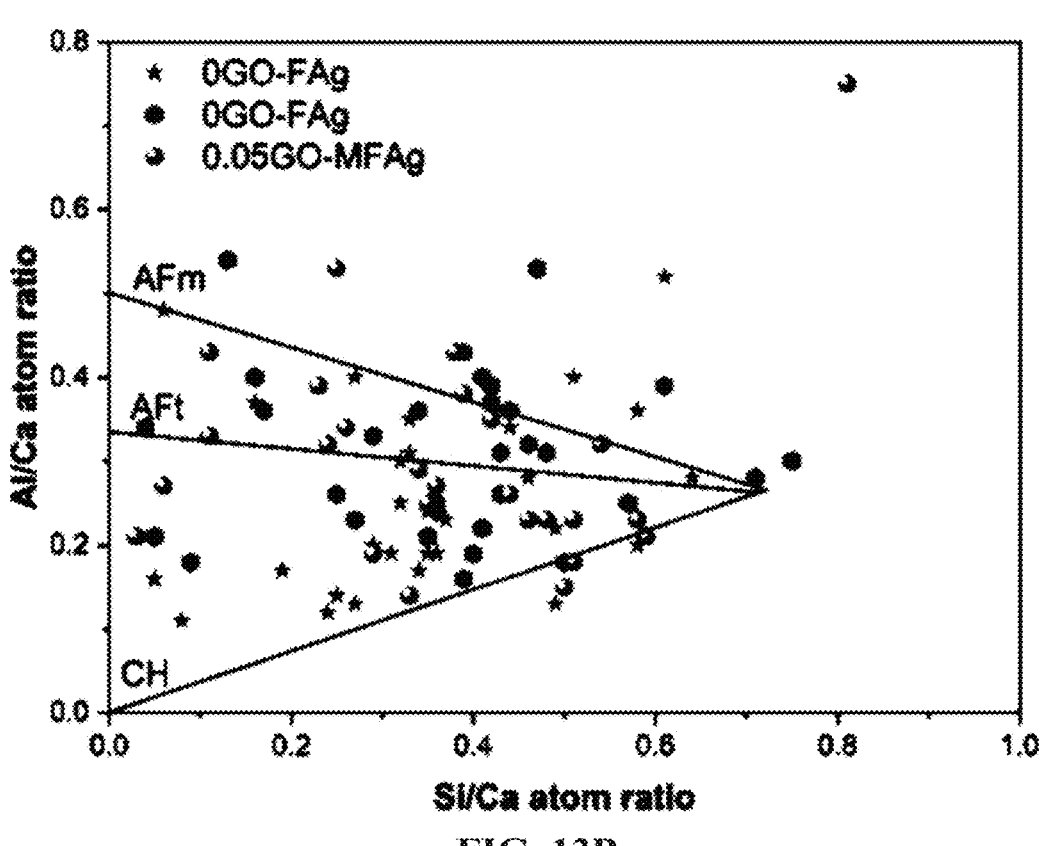
FIG. 13B shows energy-dispersive spectrometry (EDS) spot analysis for the paste of 3 specimens. These points form a Calcium-silicate-hydrate (C-S-H) cloud present in each plot.

Referring to FIG. 13, the EDS spot analysis of the three cement mortar specimens is depicted by plotting the atom ratio of Si/Ca against Al/Ca. As depicted in FIG. 13, most points were located in the range of 0 to 0.45 for Al/Ca ratio and 0.25 to 0.8 for Si/Ca ratio, respectively, which corresponds to the composition of C-S-H. The three lines drawn between the edge of the cloud of C-S-H spots in FIG. 13, which represent other hydration products, including calcium hydroxide (CH), ettringite (CH) and monosulfate (AFm). As illustrated in FIG. 13, both the Si/Ca and Al/Ca ratios at the edge of the C-S-H cloud in the ITZ areas for the 0.05GO-MFAg mortar were larger than its 0GO-FAg or 0.05GO-FAg counterparts.

The percentage of hydration products was calculated based on the SEM-BSE results to quantitatively analyze the difference between ITZ and paste. Table 6 presents the percentage of hydration products and unhydrated cement particles. In Table 6 the 0.05GO-MFAg demonstrated the highest hydration product content of 80.00% and the lowest unhydrated cement particles content of 20.00% in the ITZ areas, among the three mortar samples. Surprisingly and interestingly, a lower CH content (reduced from 20.00% to 3.33%) was observed in ITZ areas with the addition of GO-MFAg hybrid, whereas there was a little difference in the CH content in the cement matrix. Indeed, there is no significant difference in XRD data and FTIR spectra among the three samples, which further confirms that the well-dispersed GO mainly contributes to the improvement of ITZ for the sample of 0.05GO-FAg.

TABLE 6

| | | Phase in cement composites | | | | | |
| | | 0GO-FAg | | 0.05GO-FAg | | 0.05GO-MFAg | |
| | | ITZ | Paste | ITZ | Paste | ITZ | Paste |
|---|---|---|---|---|---|---|---|
| Hydration | C—S—H | 16.67 | 33.33 | 36.67 | 53.33 | 56.67 | 40.00 |
| products | C—H | 20.00 | 10.00 | 10.00 | 10.00 | 3.33 | 6.67 |
| | AFm | 6.67 | 10.00 | 10.00 | 13.33 | 20.00 | 16.67 |
| | Sum | 43.34 | 53.33 | 56.67 | 76.66 | 80.00 | 63.34 |
| Unhydrated cement particles | | 56.66 | 46.67 | 43.33 | 23.34 | 20.00 | 36.66 |

While not shown, EDS line scanning analysis of cement mortars for 0.05GO-MFAg, 0.05GO-FAg, and 0GO-FAg revealed a higher Ca/Si ratio (ranging between 1.2 and 2.3) in the ITZ areas for the 0.05GO-MFAg, and the Ca/Si ratio in that range can be indicative of typical C-S-H gel. Such results indicated that the addition of a GO-MFAg hybrid improved the ITZ and result in a denser microstructure.

Example 2

In the second example embodiment presented herein, a low cost and high efficiency strategy to develop electrically conductive cement composites through the use of conductive graphene-coated fine aggregate is disclosed. In particular, a simple and efficient method of nano-engineering that forms a uniform coating of graphene oxide (GO) onto the surface of FAg particles (deemed GO@FAg). The GO coated on the obtained GO@FAg is then annealed at 300° C. to mildly reduce GO to rGO (deemed as rGO@FAg). Microwave treatment then further reduces the rGO to graphene with high quality.

Materials and Methods

Materials

A beneficial example cement used herein was, for example, a general-purpose Portland cement (e.g., type 42.5), and its chemical composition was tested via an X-ray spectrometer (XRF). The chemical composition analysis of cement (wt %) is summarized in Table 7 below.

TABLE 7

| $SiO_2$ | CaO | $Al_2O_3$ | $Fe_2O_3$ | $SO_3$ | $Na_2O_{eq}$ | MgO |
|---|---|---|---|---|---|---|
| 22.8 | 65.4 | 4.5 | 3.3 | 2.4 | 0.5 | 0.7 |

$(Na_2O_{eq} = Na_2O + 0.658K_2O)$

For the example embodiment herein, a natural siliceous sand with a particle size ranging from 75 μm to 2.36 mm was used as the fine aggregate (FAg) although other fine aggregates discussed above can also be utilized herein without departing from the spirit and scope of the present invention. In any event, the example natural siliceous sand that was utilized to demonstrate a working embodiment was dried to reach a saturated surface dry (SSD) condition before adsorption of GO suspension. Additionally, a graphene oxide (GO) suspension with a concentration of 1 mg/mL was prepared herein based on the modified Hummer's method known to those of ordinary skill in the art. The zeta potential, chemical composition, and dimensions of the GO nanosheets are as reported in the first example embodiment presented herein.

Optimization of the Reduction Process of GO Film

To optimize the GO reduction procedure, the electrical conductivity and physical properties (e.g., appearance, microstructure, and wettability) of the GO film were charactered. Specifically, the GO aqueous solution was spin-coated and vacuum dried o produce a film. Mild reduction of the GO film was performed by annealing at different temperatures ranging from 200° C. 250° C., 300° C., 350° C. up to 450° C. for 1 h using an electrically controlled muffle furnace. Subsequently, the mildly reduced GO film was treated by a method known to those skilled in the art, i.e., was placed in a crucible and microwaved (e.g., Panasonic microwave oven, 1000 W) for about 2 s.

Preparation of Conductive G@FAg Particles

Figure 14:
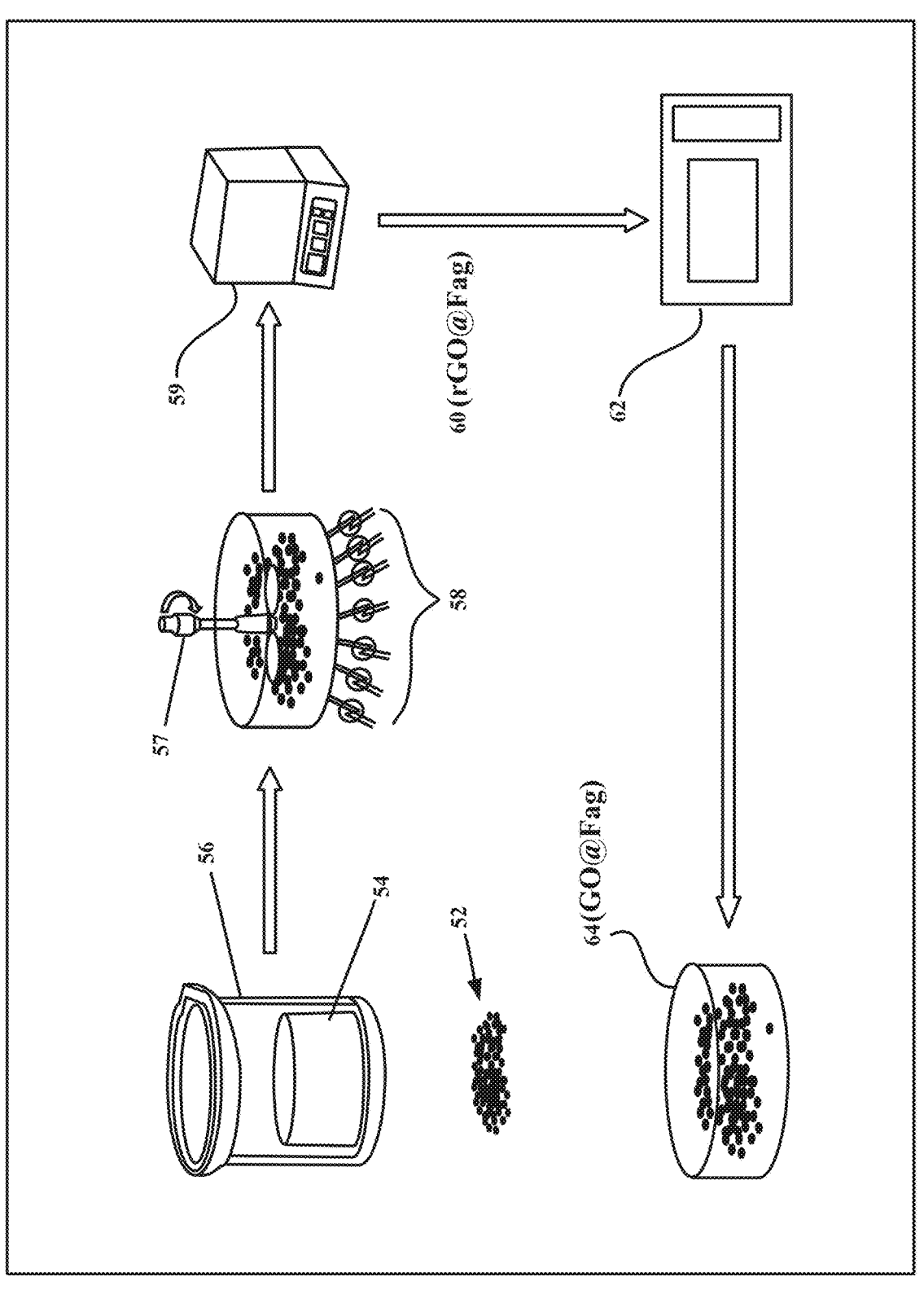
FIG. 14 illustrates a method of operation for the preparation of conductive G@FAg particles, as disclosed herein.

FIG. 14 illustrates a method of operation for the preparation of conductive G@FAg particles, as disclosed herein. A well-dispersed GO suspension (1 mg/mL) was prepared with, for example, the aid of an industry ultrasonic instrument (22.5 L, 200 W, KH-500DE) for 30 min. To elaborate, as generally shown in FIG. 14, about 1350 grams of FAg 52 and 180 mL of GO suspension 54 were poured into the wide-mouth container 56 and mechanically stirred at 50 rpm under heating (as indicated by reference character 57) at 80° C. for 2 h (e.g., shown as heating means 58), promoting the adsorption of GO on the surface of FAg particles. The relative amounts of GO and FAg particles used were determined by the assumption of equal surface area as elaborated in the first example embodiment. More specifically, with the density of GO at ~2 g/cm$^3$ and the specific surface area of FAg at ~10 m$^2$/kg, theoretically, the amount of GO nanosheets could completely cover all the surface of FAg particles.

The mixture was then over-dried at 60° C. for 48 h to obtain GO@FAg particles. Subsequently, the mild reduction of GO@FAg was carried out by annealing at 300° C. for 1 h in, for example, a muffle furnace 59. Thereafter, a mildly reduced GO@FAg 60 (denoted as rGO@FAg particles with a directional arrow in FIG. 14) was microwaved 62 for about 2 s, and the finally obtained mixture resulted, i.e., G@FAg particles 64.

Preparation of Cement Mortar Samples

Four groups of mortar samples were fabricated with a fixed water-to-cement ratio (w/c) of 0.40, and the detailed designs are presented in Table 8. All mortars were prepared by mechanically stirring for 4 min. After the mixing process, each fresh mortar mixture was cast into a steel mold pre-treated with a thin layer of demolding oil. Afterwards, the samples were compacted with a vibration table and then sealed with a polyethylene film. After being stored at room temperature (18-22° C.) for 24 h, they were demolded and cured in a standard environment (18-22° C. and ≥95% relative humidity) before testing.

Test Methods

Physical Properties and Coating Efficiency of Conductive G@FAg Particles

The evaluation of the physical properties of conductive G@FAg particles includes visual observation, Raman analysis, 24-h water absorption, and water contact angle analysis. A water contact angle measurement (OCA50, Dataphysics, Germany) was adopted to analyze the surface wettability of aggregates by water. The coating efficiency of nanomaterials on the surface of aggregates was assessed through UV-vis spectroscopy and scanning electron microscopy (SEM, ZEISS Gemini 300, Germany). The relationship between UV absorbance and GO concentration was developed using a constant solution with known concentrations (i.e., 0.01, 0.04, 0.07, 0.10, 0.30, 0.50, 0.70, and 1.00 mg/mL). The aggregate particles were over-dried at 60° C. for 48 h and then glued to a conductive adhesive. Afterwards, their surface was sputter-coated with a thin layer of gold before SEM examination.

Flowability and Mechanical Testing

The flowability of the fresh mortar mixtures was evaluated according to ASTM C1437, a standard known to those skilled in the art. The truncated cone mold was placed in the center of the flow table and cast with the fresh mixture. After 25 times of tamping, each mixture was measured for its flowability by taking the average value of the diffused mixture in two mutually perpendicular directions.

Mechanical strengths tests were performed on prismatic mortar samples (40 mm×40 mm×160 mm) after 3 days and 28 days of standard curing, respectively, according to the GB/T 17671-1999 (a standard known to those skilled in the art). For each group of mortars, flexural strength was obtained by the average of three tests using a hydraulic equipment with a loading rate of (50±10) N/s. Six samples were compressed with a loading rate of (2400±200) N/s and the average reading was recorded as the final value of the compressive strength.

Water Sorptivity Test

The water sorptivity of mortars was determined according to a standard known to those skilled in the art, ASTM C1585-13. The specimens were cut from the middle part of the original mortar and then oven dried. Their side surfaces were sealed except for the bottom and top before being submerged in water. The moisture rise in specimens was recorded by recording the mass of each specimen at fixed time intervals. The water sorptivity (I, mm) was calculated by the following Equation (6):

$$I = \frac{M_t}{A \times D} = K \times \sqrt{t} \qquad (6)$$

where, $M_t$ is the change in specimen mass (g); A and D are the exposed area (mm$^2$) of the specimen and the density

TABLE 8

| Sample ID | Cement | Aggregate particles | | | | Water | Polycarboxylate-based superplasticizer |
| | | FAg | GO@FAg | rGO@FAg | G@FAg | | |
| --- | --- | --- | --- | --- | --- | --- | --- |
| Plain | 450 | 1350 | — | — | — | 180 | 7.2 |
| GO@FAg | 450 | — | 1350 | — | — | 180 | 7.2 |
| rGO@FAg | 450 | — | — | 1350 | — | 180 | 7.2 |
| G@FAg | 450 | — | — | — | 1350 | 180 | 7.2 |

$(g/mm^3)$ of water, respectively; K and t are the water sorptivity coefficient and time (s), respectively.

Microstructure Investigation

The back-scattered electron (BSE) imaging mode in SEM analysis was employed for quantitative assessment of the interface transition zone (ITZ) in mortar samples. The cement hydration was first stopped using the solvent replacement method (soaked in ethanol for 72 h), and then the mortar samples were oven-dried at 60° C. for 48 h. The thickness of the ITZ was quantitatively evaluated with commercial software. Additionally, the SEM-BSE analysis was conducted to gain a better understanding of the porosity in ITZ with the aid of imaging software (e.g., ImageJ 1.8.0 software (National Institutes of Health, USA).

Electrical Resistivity and Piezoresistive Property Measurements

A four-electrode method (to eliminate contact resistance) was applied to measure the resistance of the tested samples. The piezoresistive behavior of the mortar samples was studied by monitoring the resistivity change under monotonic uniaxial compressive loading. The piezoresistive experiments were performed after the resistance became stable (about 0.5 h for most samples), avoiding fluctuations induced by polarization. The compressive loading was exerted on the samples in the direction perpendicular to the embedded electrodes using a universal testing machine. The applied compressive loading gradually increased to 12 kN (7.5 MPa) at a rate of 120 N/s, which is around 20% of the compressive strength of the mortars. The electrical resistivity ($\rho$, $\Omega$·cm) and fractional change in resistivity (FCR) were calculated as follows via Equations (7) and (8):

$$\rho = \frac{U}{I} \times \frac{A}{L} \qquad (7)$$

$$UFCR = \frac{\rho - \rho_0}{\rho} \times 100\% \qquad (8)$$

where, U is the voltage of two inner electrodes; I is the current through the sample; A and L are the area of the probe and the distance between the two inner electrodes, respectively; $\rho$ and $\rho_0$ are the resistivities before and under loading, respectively.

Results

Characterization of the GO/rGO/Graphene Films

In the embodiments presented herein, the effects of annealing and microwave treatments on the physical appearance and conductivity of the coated GO/rGO/graphene films are presented. While not shown, the rGO or graphene films featured an apparent luster compared to the GO film, this is because of the increased concentration and mobility charge carriers that improve the reflection to incident light as known to those skilled in the art. As expected, the electrical conductivity of the rGO film gradually increased with the annealing temperature as illustrated in FIG. 15A, and subsequent microwave treatment further greatly promoted the conductivity as illustrated in FIG. 15B. Surprisingly and unexpectedly, the calculated conductivity of the graphene film was ~180 S/cm, much higher than that of the rGO or GO film. Therefore, partial reduction of GO by annealing significantly improves the reduction of effectiveness of microwave treatment.

In addition, the annealing process made the rGO film rougher, and cracks of the film after the microwave treatment (not shown), primarily because of the sudden gas generated upon microwave treatment that induces localized explosive pressure, which tears up the film. Moreover, the water contact angle of the film increased with the pre-reduction temperature, and the microwave treatment further increased the water contact angle of the film as illustrated in FIG. 15C, implying decreasing hydrophilicity and increasing surface free energy. Such results verify the effectiveness of microwave reduction of GO. Based on these results mentioned, it can be concluded that the annealing at 300° C. followed by microwave reduction for the preparation of electrically conductive cement mortar, creates the balance required between electrical conductivity, physical properties as well as energy consumption.

Physical Properties, Coating Efficiency and Stability of Conductive G@FAg Particles Physical Properties While not shown, the brown appearance of GO@FAg particles was relatively uniform, illustrating successful and relatively uniform adsorption of GO sheets on the sand surface. The color of rGO@FAg was light black after mild reduction of GO@FAg particles by annealing at 300° C. for 1 h, while the color of G@FAg turned dark black after the microwave treatment. Turning to FIG. 16A, the Raman results indicated the gradual reduction of GO upon annealing and microwave treatment, and the low D band signal (G@FAg particles) further depicts the high quality of the graphene-coated on FAg surface.

The water contact angle of aggregate decreased from 60° (pristine FAg particles) to 27° (GO@FAg particles), confirming the attachment of hydrophilic GO nanosheets on the surface of the FAg particles as shown in FIG. 16B. The subsequent reduction process induced a decrease in the polar functionality on the GO surface, which increased the water contact angle of G@FAg particles to 80°. Correspondingly, the G@FAg particles demonstrated the lowest 24 h water adsorption as illustrated in FIG. 16C.

Coating Efficiency and Stability

Figures 17A, 17B, 17C:
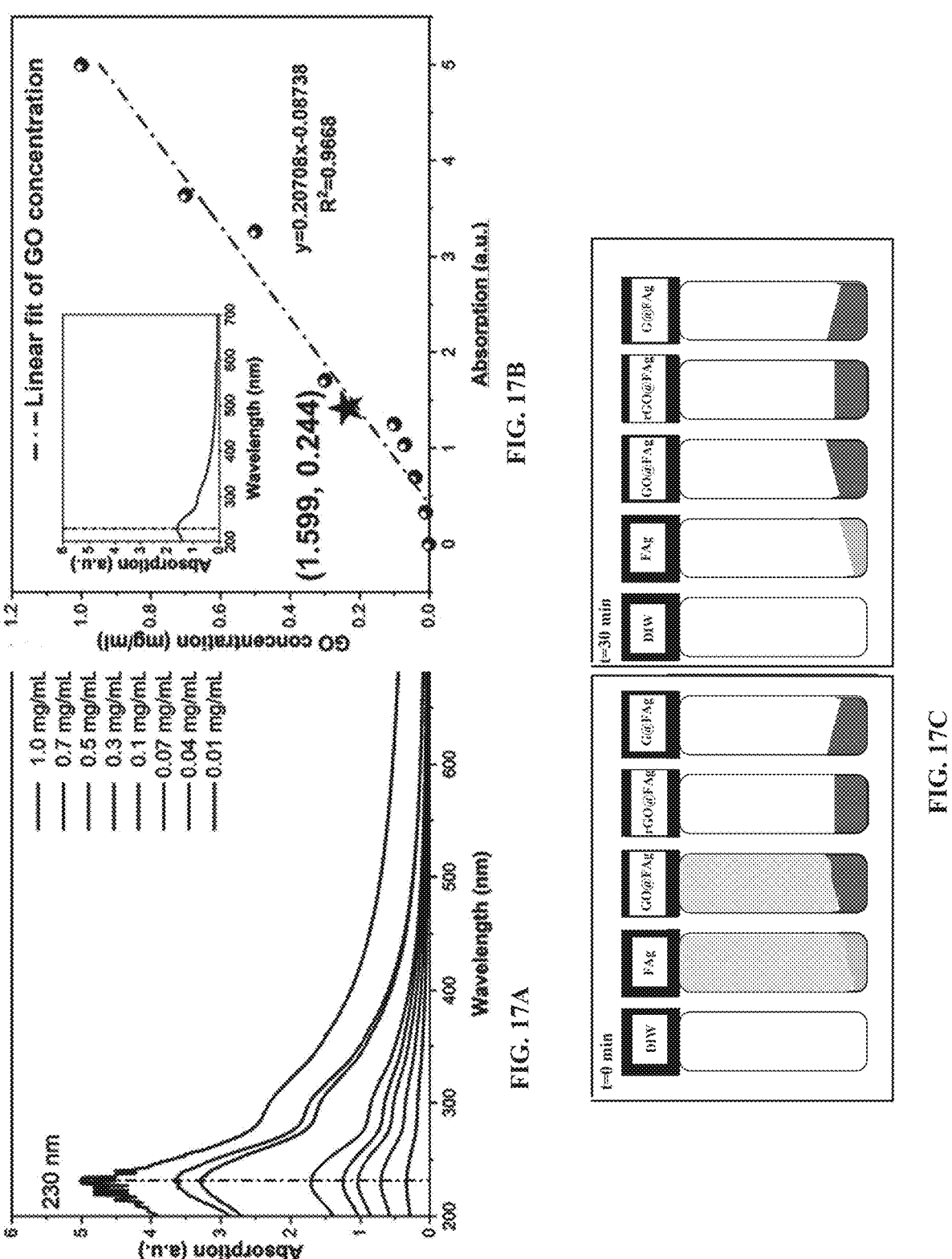
FIG. 17A shows coating efficiency assessment, i.e., the relationship between UV absorbance and GO concentration.
FIG. 17B shows coating efficiency assessment, i.e., a linear fit plot of GO at the wavelength of 230 nm, and the inset presents the UV-vis spectroscopy data of GO solution after immersion of the fine aggregate (FAg).
FIG. 17C shows coating efficiency assessment: i.e., graphical representations of real photographs of aggregates remixed with deionized water (DIW).

The coating quality and efficiency of GO nanosheets on the surface of the FAg particles are presented herein by UV-vis spectroscopy and SEM images. In particular, FIG. 17A shows an absorbance vs. concentration curve plotted using a GO solution with known concentrations. It can be deduced that the concentration of the residual GO solution after the adsorption of GO on the FAg particles was 0.244 mg/mL, as shown in FIG. 17B. For example, about 75.6% of GO adsorbed on the FAg surface.

The aggregates were remixed with water and then the glass bottles were continuously shaken for 3 min (see right set in FIG. 17C) to simulate the mixing process. Notably, the color of the upper water barely changed upon re-mixing GO@FAg, rGO@FAg, and G@FAg particles with water, indicating strong interaction between FAg particles and GO as shown by graphical re-representations of the real photographs (see FIG. 17C). The average thickness of the GO coating can be roughly estimated accordingly. With the density of GO at ~2 $g/cm^3$ and the specific surface area of FAg at ~10 $m^2$/kg, and based on the above deduced (75.6% GO nanosheets covering the surface of FAg particles), the thickness of the coated GO layer is calculated to be approximately 8.8 nm.

The secondary electron imaging (SEI) mode in SEM analysis was further used for the assessment of coating coverage. As illustrated by the graphical representation shown in FIG. 18A, for each sand sample, ten sand particles were randomly selected for SEM-SEI observation, and each sand particle was divided into nine zones in the SEM view. That is, a total of 90 pictures were collected for each sample.

Figures 18A, 18B:
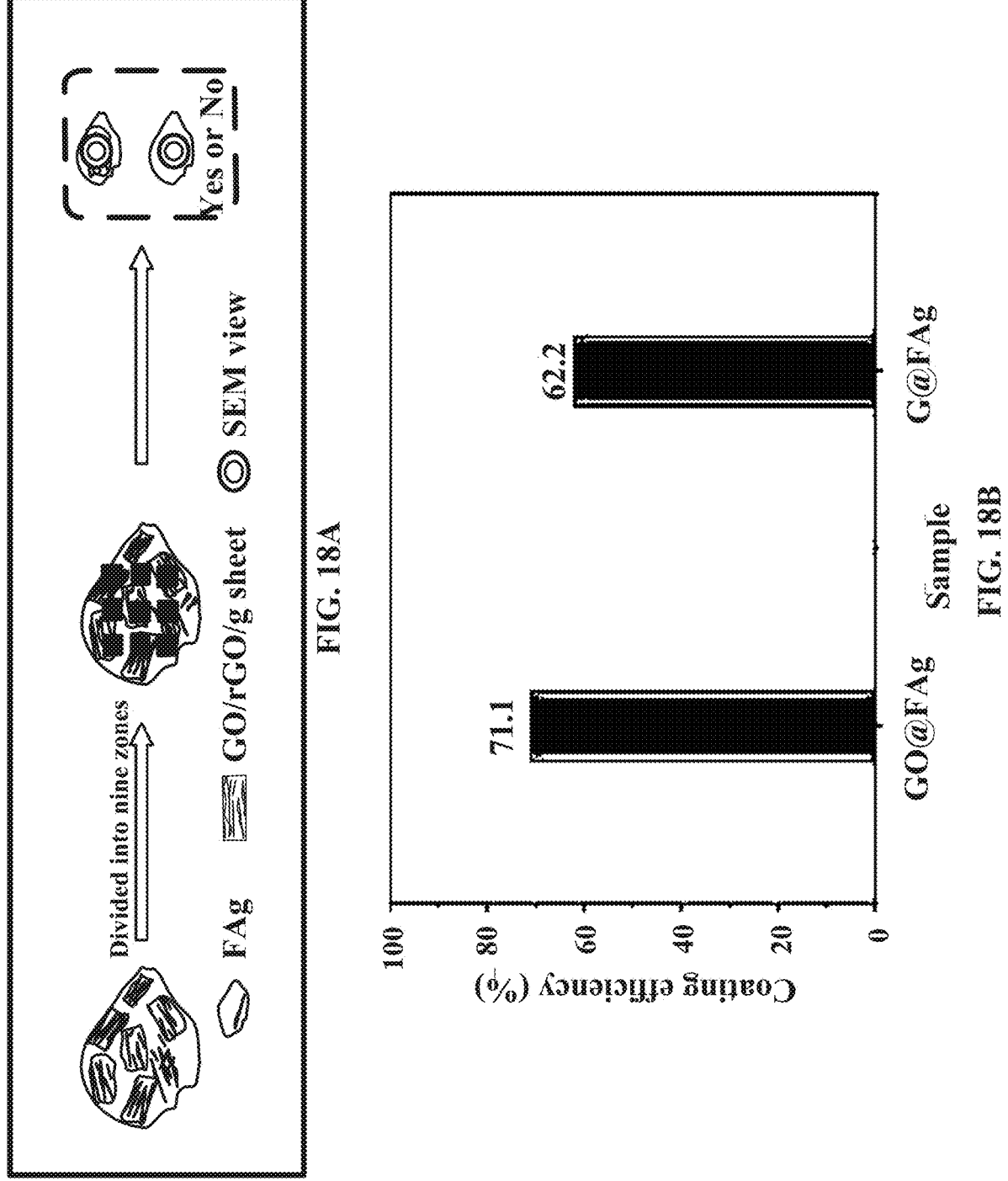
FIG. 18A shows a schematic illustration of scanning electron microscopy (SEM) analysis of embodiments herein.
FIG. 18B shows calculated results of coating efficiency.

According to the statistics of SEM images as illustrated by FIG. 18B, the coating coverage of GO and graphene on the FAg surface was 71.1% and 62.2%, respectively. The lower coating coverage of the latter suggests that some graphene might be peeled off during the GO reduction process. Surprisingly and interestingly, the coating also modified the surface morphology of the FAg. The pristine FAg particles featured a rough surface with the presence of a high level of stone dust debris, whereas the GO@FAg particles exhibited a neat surface due to the coated ultrathin GO film.

After the mild reduction, the surface of rGO@FAg particles became wrinkled and this phenomenon was more apparent for conductive G@FAg particles, which featured a high level of roughness. This agrees well with the Sem observation for the GO/rGO/graphene films as shown in FIG. 15C.

Flowability, Mechanical Strengths, and Water Sorptivity

For the development of a smart cement composite, the workability, mechanical properties, and durability of the mixture should be considered because all of these play a key role in practical applications. Different from the direct incorporation of carbon-based fillers that significantly reduces the workability of cement mixture, the conductive G@FAg particles herein results in a slight improvement in flowability and is thus beneficial for the practical application of conductive cement composites.

The mortar mixtures with various FAg including FAg with nanocoating and without nanocoating, all presented flowability without visible segregation and bleeding. As illustrated in FIG. 19A, the average flow diameter of the mortar declined by approximately 10.4% with the addition of GO@FAg particles, as compared to the plain mortar featuring an average diameter of 191 mm. This is because the well-dispersed GO nanosheet features a high specific surface area of approximately 2600 $m^2/g$, requiring a large amount of free water to wet their surfaces.

On the contrary, the average flow diameter of rGO@FAg and G@FAg mixtures increased by about 4.3% and 8.7%, respectively. Such increases likely resulted from increases in the hydrophobicity of the nanomaterial on the FAg surface, caused by a decrease in the polar functionality on the surface of nanosheets. In contrast, the negative role of conductive aggregate (porous ceramics infused with carbon black) on flow diameter, the addition of 40% conductive aggregate reduced the flow diameter by about 5%.

As illustrated in FIG. 19B and FIG. 19C, the addition of GO@FAg particles resulted in an increase of approximately 33.4% 10.4% in the 28-day compressive and flexural strengths, respectively, relative to the plain mortar. The strategy of employing GO to pre-treat FAg particles can strengthen the weakest link cement composites (i.e., ITZ) and thus achieve an excellent improvement efficiency as supported by the embodiments presented herein. Additionally, the 28-day compressive strength of the rGO@FAg and G@FAg mortars slightly decreased by 5.3% and 7.5%, respectively. Such decreases are mainly attributed to the hydrophobic nature of the rGO and graphene nanosheets that cause a relatively weaker bond between the cement matrix and the FAg particles. The bonding strength between rGO/graphene and FAg particles, we well as the mechanical properties of the coated rGO/graphene film play an important role in the strengths of the mortars.

Considering the flexibility of these two-dimensional (2D) materials, GO/rGO/graphene were formally coated on FAg surface. The bonding between these coated 2D materials with FAg substrate are extremely high. In fact, the strength of graphene was measured by nanoindentation a free-standing monolayer graphene membrane suspended over open holes, with the reactive force exactly resulting from the van der Waals interaction between graphene and substrate. In addition, the tensile strength of GO, rGO, and graphene film are in the range of 50 MPa to hundreds MPa, significantly higher than that of cement-based mortar. Therefore, ITZ in the GO@FAg, rGO@FAg, and G@FAg mortars is still the weakest region.

As illustrated through FIGS. 19D-F, the plain mortar had the highest water absorption in the four groups of mortars, while the GO@FAg mortar exhibited the lowest values. The decreased water absorption for the GO@FAg mortar mainly resulted from the improvement in density and microstructure of ITZ. Surprisingly and interestingly, the rGO@FAg and G@FAg mortars both showed a lower water absorption than the plain mortar, which is related to the improved hydrophobicity of FAg phase by the rGO or graphene coating.

Microstructure Analysis

FIGS. 20A-I display the SEM-BSE micrographs of the ITZ between FAg and cement matrix. As marked, there are voids/cracks, cement hydrates including CH and C-S-H and unhydrated cement grains. As shown, there is a clear difference between the FAg and the host matrix in all three groups of mortars. In order to quantify the porosity difference in the ITZ for all mortars, SEM-BSE images analysis was employed to segment the pores with the aid of imaging software.

Based on the obtained images with the area of pores segmented, the porosity of both ITZ and paste was calculated, and the results are provided in FIG. 20G. Clearly, the ITZ in each group of mortar showed a higher porosity than the corresponding paste, which confirms the location of the presumed ITZ, because ITZ generally features a larger interparticle spacing due to the wall effect. In particular, the porosity in the ITZ slightly increased from 41.4% (plain mortar) to 44.6% (G@FAg mortar). The thickness of ITZ was further quantitatively analyzed. As indicated in FIG. 20H, the ITZ in the plain mortar was located in the area within 15-25 μm from the interface. It is to be noted that the ITZ of plain mortar (w/c of 0.35) was about 20 μm.

However, the ITZ of the GO@FAg mortar became very narrow and smooth, demonstrating a thickness of about 5-10 μm. It is to be noted that, the ITZ region of the G@Fag mortar was slightly broader as compared to the plain mortar. Additionally, as shown in FIG. 20I, the measured compressive strength of the G@FAg mortar was lower than expected, indicating that the hydration products formed adjacent to G@FAg particles are weaker than that of the GO@FAg and plain samples.

Electrical Resistivity

Moving to FIG. 21A, all mortar samples showed a slight increasing trend in electrical resistivity with the curing time. This is because the resistance of hardened cement composites is highly dependent on the amount of free water (moisture), which facilitates the mobility of dissolved ions. In particular, the GO@FAG mortar demonstrated even higher electrical resistivity than that of plain samples, indicating that the addition of GO promoted the cement hydration reaction. The electrical resistivity of the rGO@FAg and G@FAg mortars greatly decreased, especially for the G@FAg mortar, the electrical resistivity was always below 1000 Ω·cm, two orders of magnitude lower than that of the plain mortar, mainly attributable to the adhered highly conductive graphene on the FAg surface. It is to be noted that, the resistance changes of the G@FAg mortar fluctuated slightly over the curing days, which further suggests that G@FAg (adhered graphene) rather than electrolyte of pore solution acting as the primary conductive path.

The mortars were dried in an oven for different durations (0, 12, 24, 36 and 72 h) to study the effect of pore solution on the electrical resistivity of mortar samples. As illustrated in FIG. 21B, the electrical resistivity of all four groups of mortars increased by one order of magnitude after being over-dried for 12 h. Nevertheless, the G@FAg mortar still maintained the relatively low resistivity of about 9000 $\Omega$·cm, again indicating that the electron is one of the main charge carriers for the G@FAg mortar even in a saturated state. It is to be noted that the electrical conductivity of the G@FAg mortar is significantly higher and the strength loss is considerably lower.

Piezoresistive Behavior

Figure 22A:
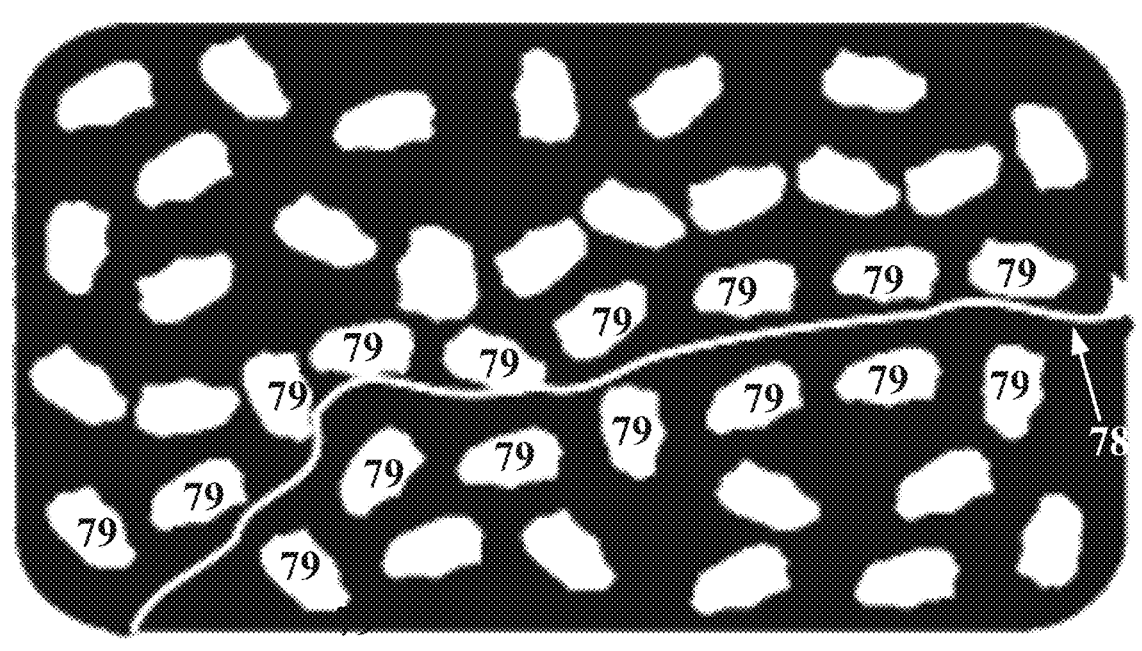
FIG. 22A shows a schematic illustration of the conductive path in a typical cement mortar.
Figure 22B:
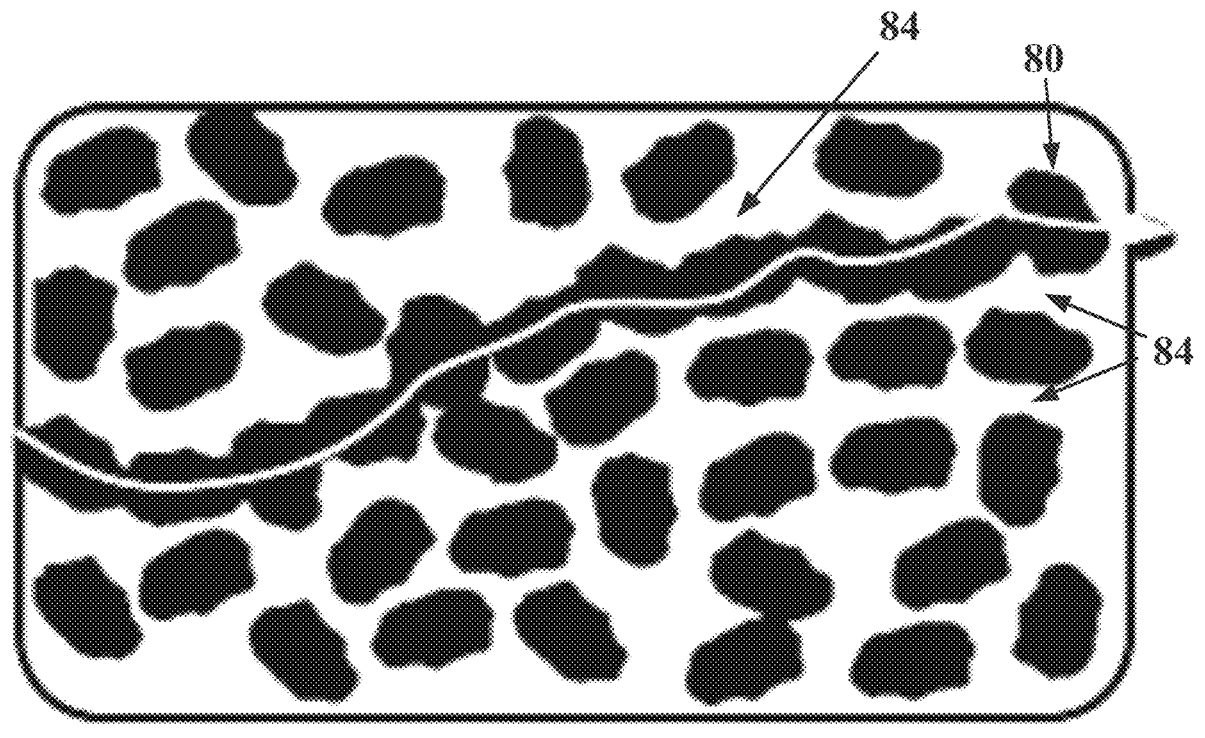
FIG. 22B shows a schematic illustration of the conductive path in a G@FAg modified cement mortar (right), as disclosed herein.

It is to be appreciated that the ITZ 78 is typically at the boundary of the conductive matrix 79 (not all conductive particles labeled), as illustrated in FIG. 22A. In contrast, the G@FAg disclosed herein mainly constitutes the conductive path 80 (also denoted by white path (i.e., electron path)), as shown in FIG. 22B with ITZs 84 in between. The embodiments presented herein for the conductive path thus provides a much higher sensitive smart concrete which specifically aids to monitor the health state of ITZ.

Figure 23A:
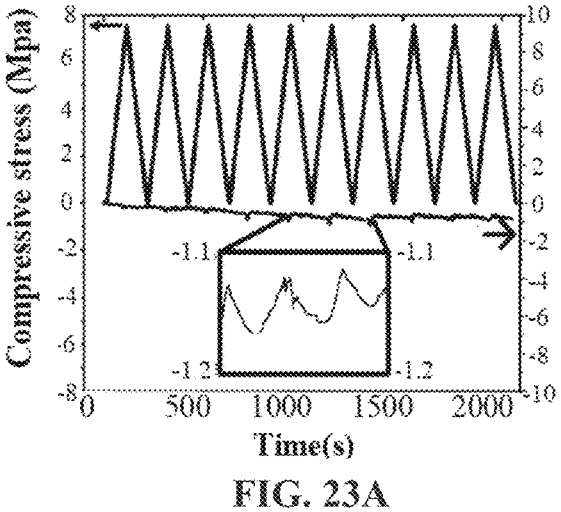
FIG. 23A show piezoresistive behavior of plain mortar under cyclic compressive loading.
Figure 23B:
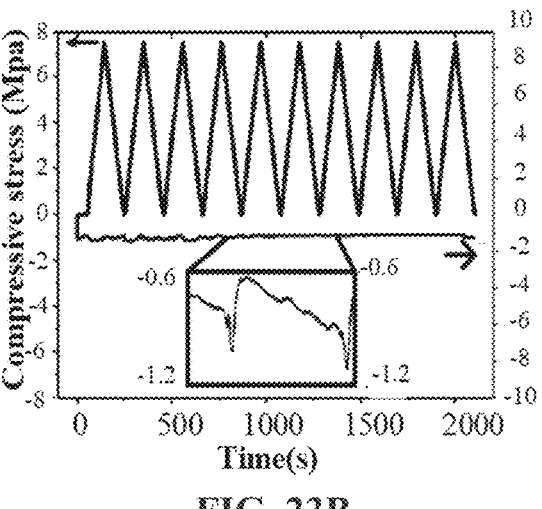
FIG. 23B show piezoresistive behavior of GO@FAg under cyclic compressive loading.
Figure 23C:
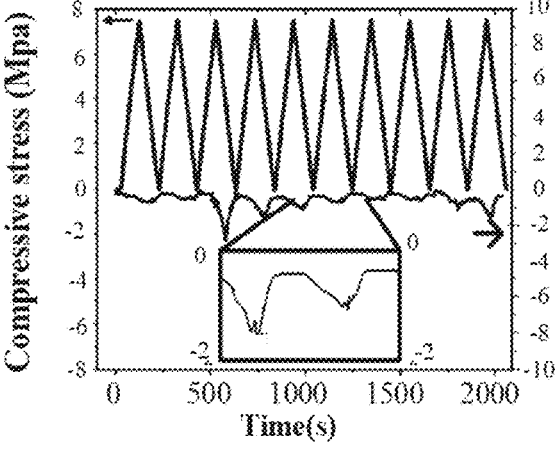
FIG. 23C show piezoresistive behavior of rGO@FAg under cyclic compressive loading.
Figure 23D:
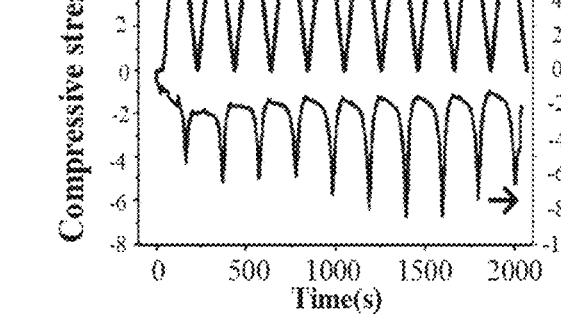
FIG. 23D show piezoresistive behavior of G@FAg under cyclic compressive loading.

FIGS. 23A-D plots the relationship between compressive stress, FCR, and time under cyclic compressive loading. It is to be noted that, the FCR values of plain and GO@FAg mortars featured disorganized distribution, indicating that these two groups of mortars are not applicable for strain sensing. Surprisingly and interestingly, during each compressive loading cycle, the FCR values of GO@FAg mortars decreased with compressive stress and then increased to the initial values upon unloading. In addition, the resistivity of the G@FAg mortars apparently decreases as the strain increases, with the average maximum FCR as high as 18%, as illustrated in FIG. 23D. Additionally, the G@FAg mortar exhibited more constant FCR in each loading-unloading cycle without the interference of noise, as compared to the other three groups of mortars, indicating the great potential to act as sensors for strain measurement.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example(s) chosen for purposes of disclosure and covers all changes and modifications which do not constitute departures from the true spirit and scope of this invention.

We claim:

1. A cured cementitious composite, comprising:
a modified aggregate material, comprising a plurality of modified fine aggregate (modified FAg) particles that are bound, in a spatial distribution, within a hardened paste also comprising a cement and water
wherein:
    the modified FAg particles comprise FAg particles coated with a graphene oxide (GO) as a GO layer that is adsorption bonded on surfaces of the FAg particles,
    the modified FAg particles are bound to the hardened paste by respective refined interfacial transition zones (refined ITZs) having a plurality of crosslinked structures of the graphene oxide (GO) layer and a plurality of crosslinks of structures of the GO layer with structures of the hardened paste, and the refined interfacial transition zone (ITZs) have a thickness of 3 μm to 10 μm.

2. The cementitious composite of claim 1, wherein the modified aggregate material is configured with a porosity of about 18 percent and with a plurality of pores having an average pore diameter of about 34 nm.

3. The cementitious composite of claim 1, wherein the modified aggregate material further comprises a plurality of graphene fine aggregate conductive particles.

4. The cementitious composite of claim 3, wherein up to 62.2% of the surface area of the graphene fine aggregate conductive particles is covered by graphene and with an average thickness of about 8.8 nm.

5. The cementitious composite of claim 3, wherein the conductivity of the graphene fine aggregate conductive particles is up to 180 S/cm.

6. The cementitious composite of claim 3, wherein the plurality of graphene fine aggregate conductive particles include at least: i) a plurality of thermally conductive particles, or ii) a plurality of electrically conductive particles, or both i) and ii).

7. The cementitious composite of claim 1, wherein the fine aggregate particles (FAg) are selected from at least one of, or from any combination or sub-combination of a sand, a crushed aggregate, an agro-waste, and an industrial waste.

8. The cementitious composite of claim 7, wherein the sand is selected from at least one of, or from any combination or sub-combination of a siliceous sand, a carbonaceous sand, a dune sand, a granite sand, a waste foundry sand, and a basalt sand.

9. The cementitious composite of claim 7, wherein the crushed aggregate is selected from at least one of, or from any combination or sub-combination of a biochar, a crumb rubber, a waste plastic, a recycled glass, a recycled aggregate, a reclaimed asphalt pavement, a recycled brick, a recycled ceramic, a mining tailing, a coal fly ash, a bottom ash, and a biomass fly ash.

10. The cementitious composite of claim 7, wherein the agro-waste is selected from at least one of, or from any combination or sub-combination of a groundnut shell, an oyster shell, a cork, a coffee ground, a tobacco waste, a bagasse ash, a sawdust ash, and a municipal limestone.

11. The cementitious composite of claim 7, wherein the industrial waste is selected from at least one of, or from any combination or sub-combination of an air cooled slag, a steel slag, a copper slag, a blast furnace slag, a ferrochrome slag, an imperial smelting furnace slag, a palm oil clinker, a solid waste incineration fly ash or a bottom ash.

12. A composite preparation method, comprising:
pre-adsorbing particles of a fine aggregate material with a graphene oxide in an aqueous dispersion, wherein an amount of the graphene oxide in the aqueous dispersion is from about 0.01 to 0.06 percent by weight of the total weight of water and graphene oxide (GO), such that the pre-adsorbing results in an aqueous dispersion of a modified fine aggregate material, the modified fine aggregate material comprising the particles of the fine aggregate material configured with pre-adsorption bonded layers of GO; and
adding to the aqueous dispersion of the modified aggregate material a water/cement (w/c) to obtain a ratio content of water/cement/modified fine aggregate material so as to result in a cementitious composite.

13. The composite preparation method of claim 12, further comprising curing the cementitious composite at a temperature range of about 20° C. with a humidity of greater than 95%.

14. The composite preparation method of claim 12, further comprising selecting the aggregate material from at least one of, or from any combination or sub-combination of a sand, a crushed aggregate, an agro-waste, and an industrial waste.

15. The composite preparation method of claim 14, wherein the sand is selected from at least one of, or from any combination or sub-combination of a siliceous sand, a carbonaceous sand, a dune sand, a granite sand, a waste foundry sand, and a basalt sand.

16. The composite preparation method of claim 14, wherein the crushed aggregate is selected from at least one of, or from any combination or sub-combination of a biochar, a crumb rubber, a waste plastic, a recycled glass, a recycled aggregate, a reclaimed asphalt pavement, a recycled brick, a recycled ceramic, a mining tailing, a coal fly ash, a bottom ash, and a biomass fly ash.

17. The composite preparation method of claim 14, wherein the agro-waste is selected from at least one of, or from any combination or sub-combination of a groundnut shell, an oyster shell, a cork, a coffee ground, a tobacco waste, a bagasse ash, a sawdust ash, and a municipal limestone.

18. The composite preparation method of claim 14, wherein the industrial waste is selected from at least one of, or from any combination or sub-combination of an air cooled slag, a steel slag, a copper slag, a blast furnace slag, a ferrochrome slag, an imperial smelting furnace slag, a palm oil clinker, a solid waste incineration fly ash or a bottom ash.

\* \* \* \* \*